United States Patent [19]
Utagawa

[11] Patent Number: 5,926,561
[45] Date of Patent: Jul. 20, 1999

[54] IMAGE PROCESSING APPARATUS AND METHOD FOR PERFORMING COLOR CONVERTING PROCESS

[75] Inventor: Tsutomu Utagawa, Yokohama, Japan

[73] Assignee: Canon Kabushiki Kaisha, Tokyo, Japan

[21] Appl. No.: 08/731,681

[22] Filed: Oct. 16, 1996

[30] Foreign Application Priority Data

Oct. 16, 1995 [JP] Japan ................................... 7-267054

[51] Int. Cl.⁶ .................................................. G06K 9/36
[52] U.S. Cl. ........................................ 382/166; 382/164
[58] Field of Search ........................... 382/162, 164–167; 358/537

[56] References Cited

U.S. PATENT DOCUMENTS

| | | | |
|---|---|---|---|
| 4,812,904 | 3/1989 | Maring et al. | 358/107 |
| 4,855,765 | 8/1989 | Suzuki et al. | 346/154 |
| 4,873,570 | 10/1989 | Suzuki et al. | 358/80 |
| 5,028,991 | 7/1991 | Sekizawa et al. | 358/75 |
| 5,311,334 | 5/1994 | Sugiura | 358/537 |
| 5,548,663 | 8/1996 | Sekine et al. | 382/164 |
| 5,552,905 | 9/1996 | Tanaka | 358/523 |
| 5,680,327 | 10/1997 | Cook et al. | 364/526 |

*Primary Examiner*—Thomas D. Lee
*Assistant Examiner*—Stephen Brinich
*Attorney, Agent, or Firm*—Fitzpatrick, Cella, Harper and Scinto

[57] ABSTRACT

An image processing apparatus for previewing an output result to be output by an image output device includes a first color designating device having a plane member on which an original is mountable, the device for inputting coordinate information relating to a color in the original, a second color designating device for designating a color on a preview image, a color converting device for performing a color conversion on the basis of the color designated by the first color designating device or the color designated by the second color designating device, and an operator input device for determining whether or not a preview image showing a processing result of color conversion based on the color designated by the first color designating device is unsuitable to an operator. If the preview image showing a processing result of the color conversion based on the color designated by the first color designating device is unsuitable to an operator, a color is designated by the second color designating device.

14 Claims, 25 Drawing Sheets

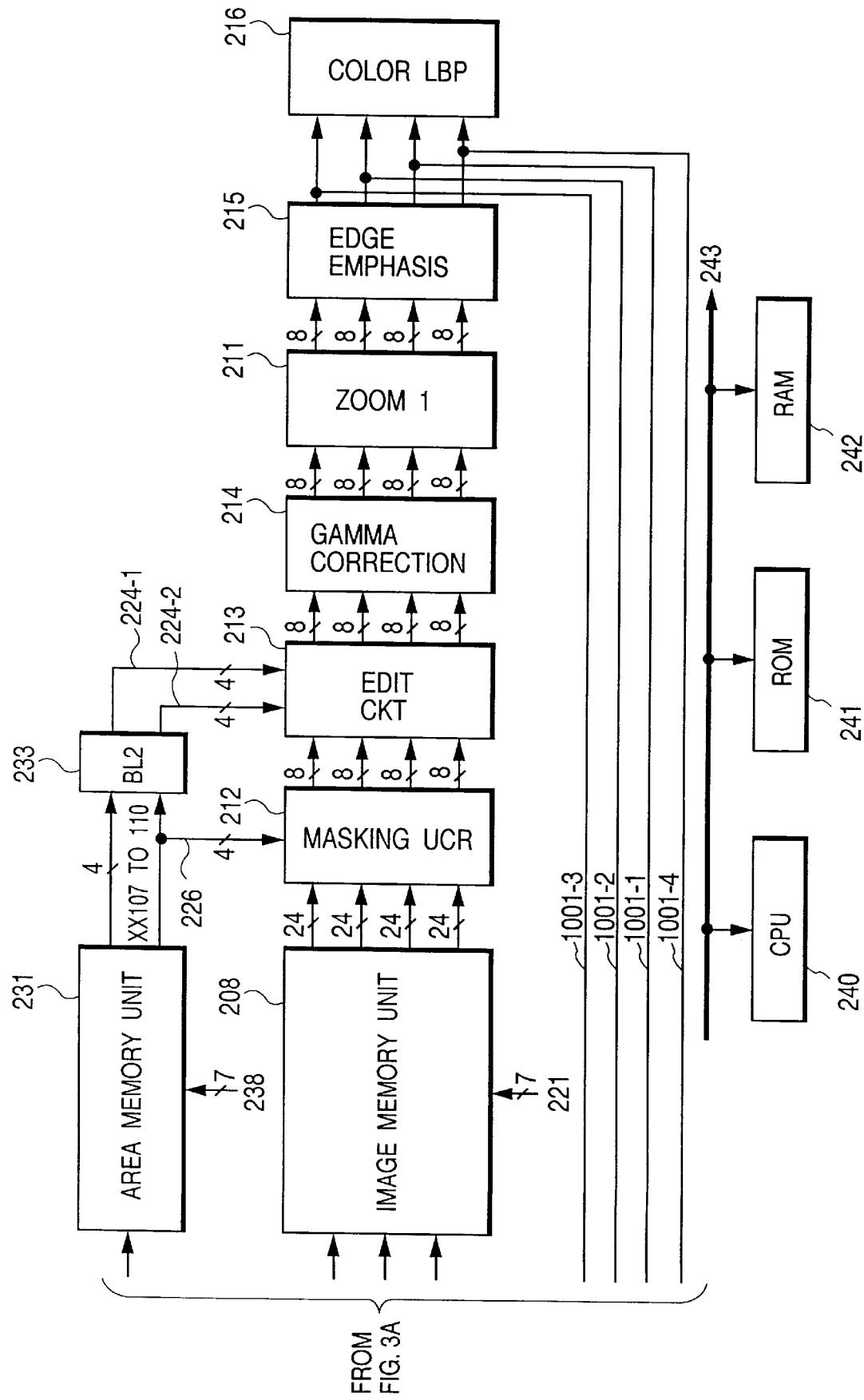

IMAGE PROCESSING APPARATUS AND METHOD FOR PERFORMING COLOR CONVERTING PROCESS

BACKGROUND OF THE INVENTION

1. Field of the Invention

The invention relates to image processing apparatus and method for performing a color converting process.

2. Related Background Art

In recent years, the realization of a high picture quality and a high function of a digital color copying apparatus have been progressed and can fairly meet the expectation of the user with respect to a hue of an output image and an editing process. In such a situation, in order to obtain a desired output image, copying apparatuses having what is called a preview function such that an image is displayed on a monitor or the like and is confirmed in place of outputting the image to papers many times are being put into practical use.

Among them, there is also an apparatus for displaying and confirming an original image which was read by using a black and white liquid crystal display. However, in case of a color copying apparatus, since a hue of an output image cannot be confirmed as well, it is desirable that a display apparatus is also a preview system which can display a full-color image.

FIG. 28 shows an example of such a system and a block shown by reference numerals 101 to 109 constructs a full-color copying apparatus and reference numerals 110 to 112 shows a block diagram for preview.

In the diagram, reference numeral 101 denotes a sensor of RGB outputs to read a reflected image of an original; 102 an S/H and A/D conversion circuit; 103 a circuit to perform a shading correction; 104 an input masking circuit; 105 a log conversion circuit; 106 a masking and UCR circuit for matching a color with characteristics of a printer; 107 an edit circuit to perform various image editing processes such as trimming, masking, painting, zooming, and the like; 108 an edge emphasis circuit; and 109 a printer for scanning the reflected original image (not shown) three or four times, thereby obtaining a full-color image output.

Reference numeral 110 denotes an image memory unit to store image signals (RGB) after completion of the input masking process in the circuit 104; 111 a memory control circuit for controlling the image memory unit 110 through an address counter (not shown) and a CPU (not shown); and 112 a monitor to display image memory information. In this case, a result of an image edition which is executed by the edit circuit 107 cannot be confirmed by the monitor.

When executing what is called a color converting process to convert a partial color of an original image into another color as one of the image editions, there is used a method whereby the original is put onto means, namely, what is called a digitizer for designating an arbitrary position or area on the original and a color of the original to be converted is designated by using a coordinates input pen or the like.

However, in the system shown in the above prior art, since the image processing result of the copying apparatus main body cannot be reflected to a screen of the monitor, the image processing result cannot be confirmed unless it is printed out each time.

When performing the color converting process, as mentioned above, after coordinates of the color to be converted was designated on the digitizer, the original is moved onto an original supporting glass plate and an original reading operation is executed. Therefore, there is a situation such that the coordinates of the original color to perform the designated color conversion on the digitizer are deviated from those on the original supporting glass plate, so that a color converting process which the operator desires cannot be preferably performed. In such a case, the above processes have to be again executed.

SUMMARY OF THE INVENTION

It is an object of the invention to provide image processing apparatus and method which can eliminate the foregoing problems.

Another object of the invention is that by enabling both of the designation of a color on a digitizer and the designation of a color in a preview image to be executed, a color designation to perform a desired color converting process can be easily and properly executed.

To accomplish the above objects, according to the invention, there is provided an image processing apparatus for previewing an output result in case of outputting a target image by desired image output means, comprising: a digitizer to designate a color on the basis of the target image; color designating means for designating a color on a preview image; and color converting means for performing a color conversion on the basis of the color designated by the digitizer or the color designating means, wherein when the preview image showing a processing result of the color conversion based on the color designated by the digitizer cannot be satisfied, the color is again designated by the color designating means.

The above and other objects and features of the present invention will become apparent from the following detailed description and the appended claims with reference to the accompanying drawings.

DESCRIPTION OF THE PREFERRED EMBODIMENTS

Figure 1:
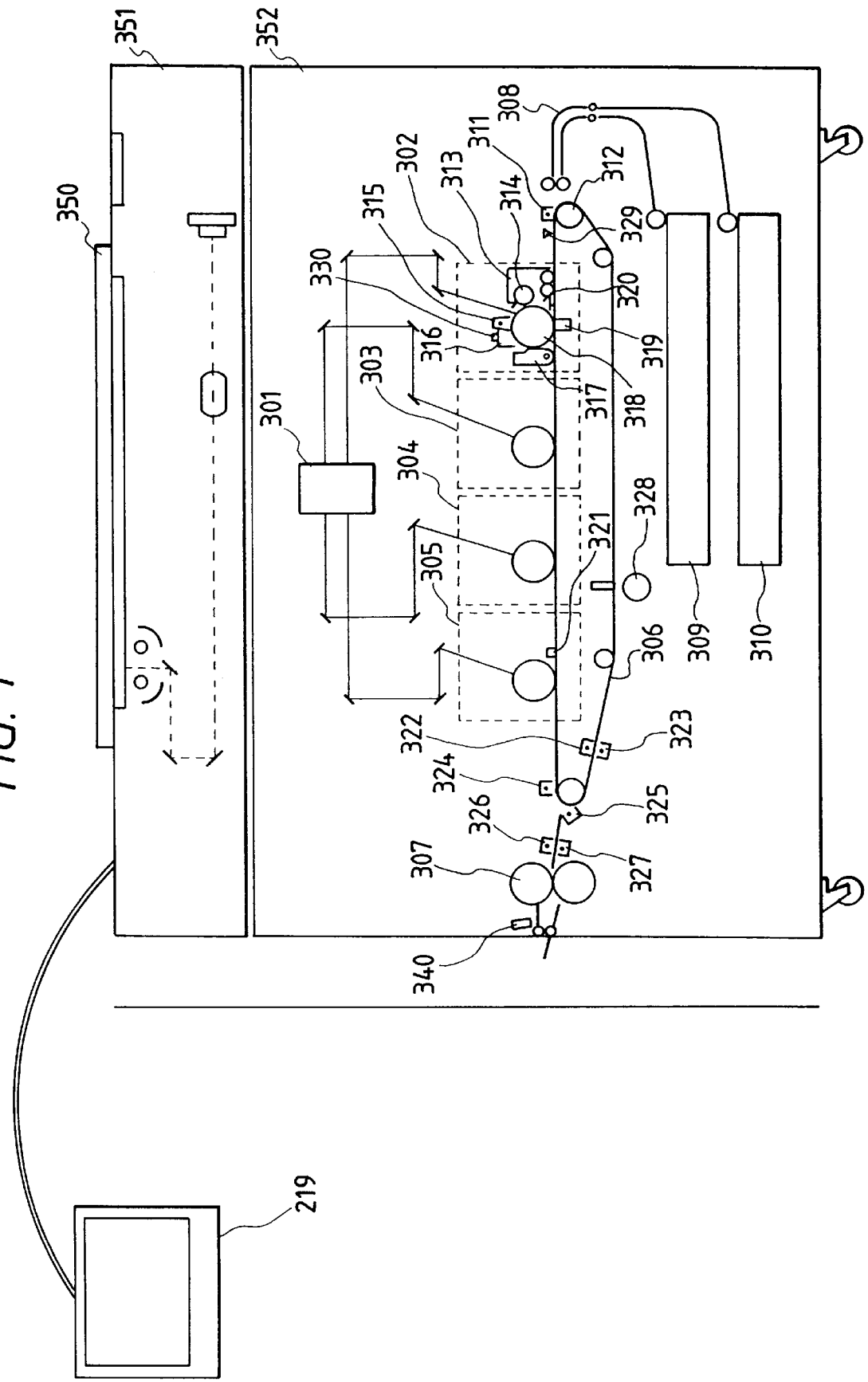
FIG. 1 is a diagram showing an example of a schematic view of an image processing apparatus.

FIG. 1 is a schematic diagram of a copying apparatus in an embodiment.

The copying apparatus in the embodiment is divided into a color reader unit 351 for reading an original and performing a digital editing process or the like and a printer unit 352 which has a plurality of drums and reconstructs a color image in accordance with a digital image signal of each color which is sent from the reader unit.

Further, the copying apparatus has a digitizer 350 and a monitor 219 to perform a preview display.

The monitor 219 and a main body of the copying apparatus are connected by a VGA interface.

Construction of the Printer Unit

Figure 2:
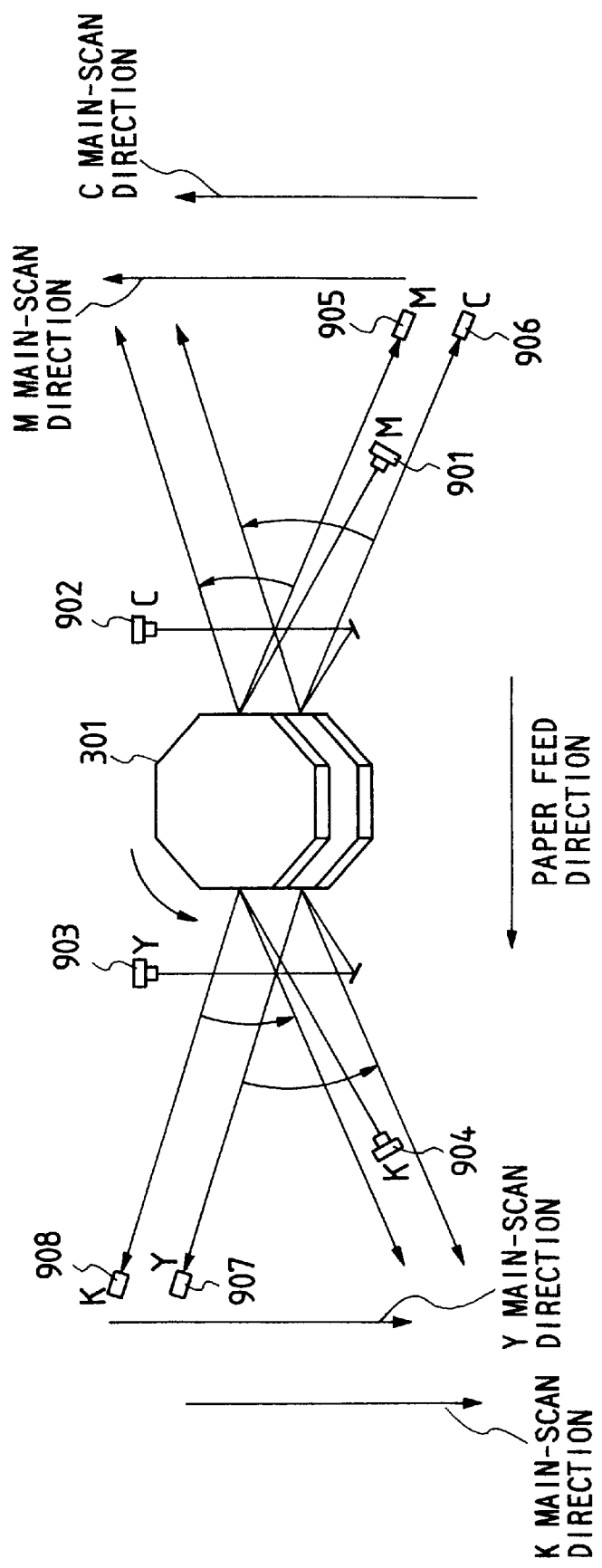
FIG. 2 is a diagram showing an example of a construction of a polygon scanner.

In FIG. 1, reference numeral 301 denotes a polygon scanner for scanning a laser beam onto a photosensitive drum; and 302 indicates an image forming unit of magenta (M) at the first stage. Image forming units 303, 304, and 305 with respect to cyan (C), yellow (Y), and black (K) each having a construction similar to the image forming unit 302 are also provided. As shown in FIG. 2, the polygon scanner 301 scans laser beams from laser elements 901 to 904 which are driven independently with respect to M, C, Y, and K by a laser control unit onto photosensitive drums of the respective colors. Reference numerals 905 to 908 denote BD detecting means each for detecting the scanned laser beam and generating a main-scan sync signal. In the case where two polygon mirrors are coaxially arranged and are rotated by one motor as shown in the embodiment, for example, the scan directions of the main-scan of the laser beams of (M and C) and (Y and K) are the opposite directions. Therefore, for the images of (M and C), the other images (Y and K) are ordinarily set to mirror images for the main-scan direction.

In the image forming unit 302, reference numeral 318 denotes a photosensitive drum to form a latent image by an exposure of the laser beam; 313 a developing device to develop a toner onto the drum 318; 314 a sleeve which is provided in the developing device 313 and executes a toner development by applying a developing bias; 315 a primary charging device for charging the photosensitive drum 318 to a desired potential; 317 a cleaner to clean the surface of the drum 318 after completion of a copy transfer; 316 an auxiliary charging device for discharging the surface of the drum 318 cleaned by the cleaner 317, thereby enabling a good charging to be obtained by the primary charging device 315; 330 a pre-exposing lamp to erase residual charges on the drum 318; and 319 a transfer charging device for discharging the charges from the back surface of a transfer belt 306 and transferring a toner image on the drum 318 onto a transfer material.

Reference numerals 309 and 310 denote cassettes for enclosing the transfer materials; 308 a paper feed unit to supply the transfer materials one by one from the cassette 309 or 310; 311 an adsorption charging device for adsorbing the transfer material fed by the paper feed unit onto the transfer belt; and 312 a transfer belt roller which is used to rotate the transfer belt 306 and adsorbs and charges the transfer material onto the transfer belt 306 in cooperation with the adsorption charging device as a pair.

Reference numeral 324 denotes a discharging and charging device for allowing the transfer material to be easily separated from the transfer belt 306; 325 a peel-off charging device for preventing an image disturbance due to a peel-off discharge when the transfer material is separated from the transfer belt; 326 and 327 pre-fixing charging devices for supplementing an adsorbing force of the toner on the transfer material after the separation and preventing the image disturbance; 322 and 323 transfer belt discharging and charging devices for discharging the transfer belt 306 and electrostatically initializing the transfer belt 306; 328 a belt cleaner to eliminate a fouling of the transfer belt 306; 307 a fixing device for thermally fixing the toner image on the transfer material which was separated from the transfer belt 306 and again charged by the pre-fixing charging devices 326 and 327 onto the transfer material; 340 a paper ejection sensor for detecting the transfer material on a conveying path passing the fixing device; and 329 a paper edge sensor to detect a front edge of the transfer material fed onto the transfer belt by the paper feed unit 308. A detection signal from the paper edge sensor is sent from the printer unit to the reader unit and is used to generate a sub-scan sync signal when a video signal is supplied from the reader unit to the printer unit.

Construction of the Reader Unit

Figure 3A:
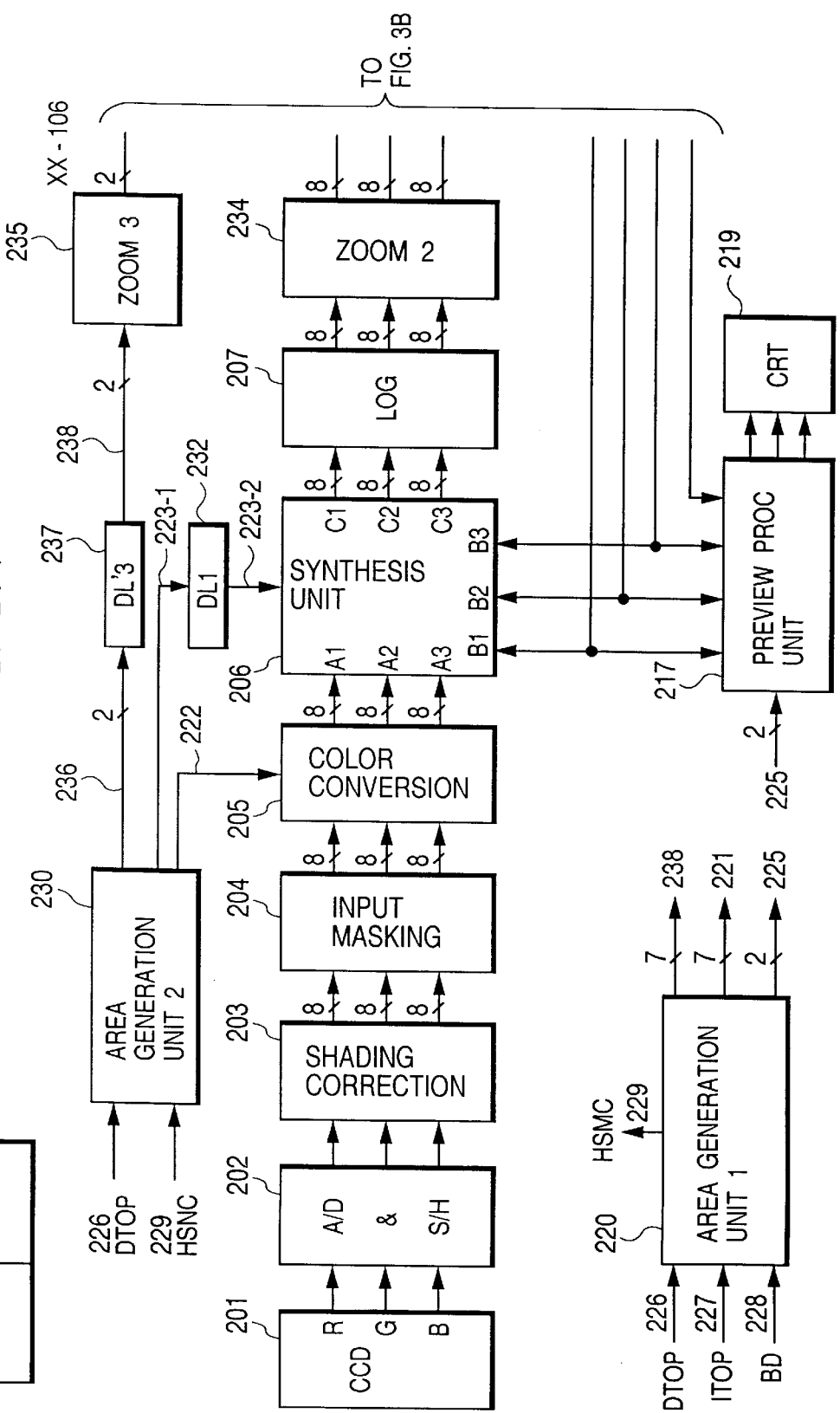
FIG. 3 which is composed of FIGS. 3A and 3B is a diagram showing an example of a construction of the image processing apparatus.

FIGS. 3A and 3B are block diagrams of a digital image processing unit in a reader 12. A color original put on an original supporting glass plate of the reader is exposed by a halogen lamp provided for an optical system 13. A reflected image from the original is picked up by a CCD 201 and is further sampled and held and is subsequently converted into digital signals by an A/D and S/H circuit 202, so that the digital signals of three colors of R, G, and B are formed. Each color separation data is subjected to a shading and black correction by a shading correction circuit 203, a correction to an NTSC signal by a masking circuit 204, and a color conversion by a color conversion circuit 205 and the resultant data is supplied to a synthesis unit 206. Reference numeral 206 denotes the portion for performing a synthesis of image data of the reflected original and the output data from an image memory unit 208 or the like. The synthesis result is subjected to a log correcting process by a log conversion circuit 207 and, further, a zooming process (when a zoom mode is set) by a zoom circuit 234. As for the zooming process, since a compressing process which is executed by the image memory unit 208 operates as a low pass filter, specifically speaking, an enlarging process is executed. An output of the zoom circuit 234 is further supplied to the image memory unit 208.

The image memory unit 208 is constructed by three units of a compression unit, an image memory unit, and a decompression unit. CMY data (24 bits×4) before an output masking process corresponding to the four drums is read out from the image memory unit 208.

The compression unit converts the CMY density data into L*a*b* data and executes a vector quantization as an irreversible compression.

Reference numeral 212 denotes a masking UCR unit to form a chrominance signal for each drum and the chrominance signals suitable for the characteristics of the printer are generated. Reference numeral 213 denotes an edit circuit to perform a free-color process and a painting process. An edition result is subjected to a gamma (γ) correction by a gamma correction circuit 214, a zoom (specifically speaking, reducing process) by a zoom circuit 211, and further, an edge emphasis by an edge emphasis circuit 215 and the resultant data is sent to a color LBP 216.

Reference numeral 217 denotes a preview processing unit constructed by a CRT image memory to store the edited image data and a memory control unit to control the CRT image memory. Reference numeral 219 denotes a CRT display to display the data in the CRT image memory.

Reference numeral 220 denotes an area generation unit-1 for inputting and outputting the following signals: a signal 229 of either one of a signal formed on the basis of a main-scan sync signal and a signal BD 228 which is sent from the LBP printer 216; an output signal DTOP 226 of the image edge sensor; an ITOP signal (when outputting an image by the printer, a sub-scan enable signal synchronized with each drum is formed on the basis of the ITOP signal) 227 which is formed in the LBP printer; a signal 221 for controlling the image memory in the image memory unit 208 by total seven kinds of signals comprising two kinds of write enable signals (main-scan 221-1, sub-scan 221-2) and five kinds of read enable signals (main-scan 221-3, sub-scan 221-M, 221-C, 221-Y, 221-K); a signal 238 (main-scan write enable signal 238-1, sub-scan write enable signal 238-2, main-scan read enable signal 238-3, sub-scan enable signals 238-M, 238-C, 238-Y, 238-K) formed in consideration of delays of the compression unit and decompression unit in the image memory unit 208 so as to adjust the timings of the image signal and the area signal synchronously with the ITOP signal 227; and an enable signal 225 (one kind of main-scan, one kind of sub-scan) of the CRT image memory in a preview processing unit.

Reference numeral 230 denotes an area generation unit-2 to generate an area signal for each editing process. As will be explained hereinlater, the area generation unit-2 is constructed by a bit map memory unit to store each area signal and a bit map memory control unit (for example, AGDC (Advanced Display Controller)) to control the bit map memory. The writing operation for the area generation unit-2 is executed by a CPU 240 and the reading operation is executed synchronously with the signals DTOP 226 and HSNC 229 which are synchronized with the scan of the original image. Reference numeral 222 denotes an enable signal of the color conversion circuit 205, 223-1 an enable signal of the image synthesis unit 206; and 236 an enable signal of a free-color mode or painting mode.

An area memory unit 231, delay circuits 232 (DL1), 233 (DL2), and 237 (DL3), and a zoom circuit 235 (zoom 3) operate as circuits for a timing adjustment to synchronize the image signal and the area signal.

Specifically speaking, the delay circuit DL1 delays an output signal 223-2 of the area generation unit 230 by a processing time of the color conversion circuit 205. A pixel delay is performed by a D-type flip-flop and a line delay is performed by an FIFO memory.

The delay circuit DL2 delays the output signal 226 of the area memory unit 231 by a processing time of the masking UCR unit 212. A pixel delay is performed by a D-type flip-flop and a line delay is performed by an FIFO memory.

The delay circuit DL3 delays the output signal 236 of the area generation unit 230 by a total time of a processing time of the color conversion circuit 205, a processing time of the image synthesis circuit 206, and a processing time of the log conversion circuit 207. A pixel delay is performed by a D-type flip-flop and a line delay is performed by an FIFO memory.

Specifically speaking, the zoom circuit 235 executes an enlarging process and is controlled in substantially the same manner as that of the zoom circuit 234 (the number of delays is also the same).

The CPU 240 controls a program ROM 241 and a work RAM 242 through a CPU bus 243. All of the above circuits are connected to the CPU bus 243 and data is set from the CPU 240 through the CPU bus 243, respectively.

Figure 6:
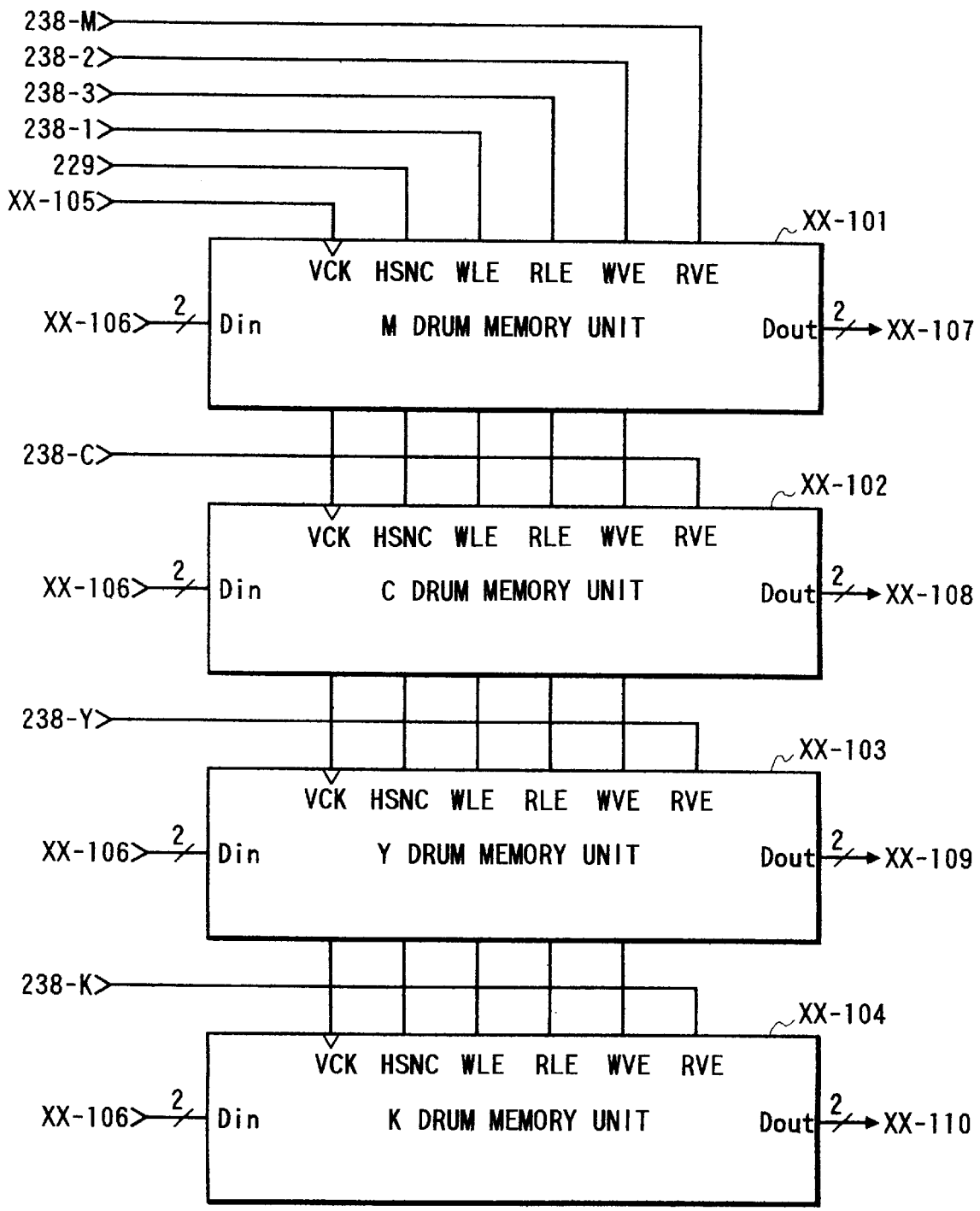
FIG. 6 is a diagram showing an example of a construction of an area generation unit-2.
Figure 7:
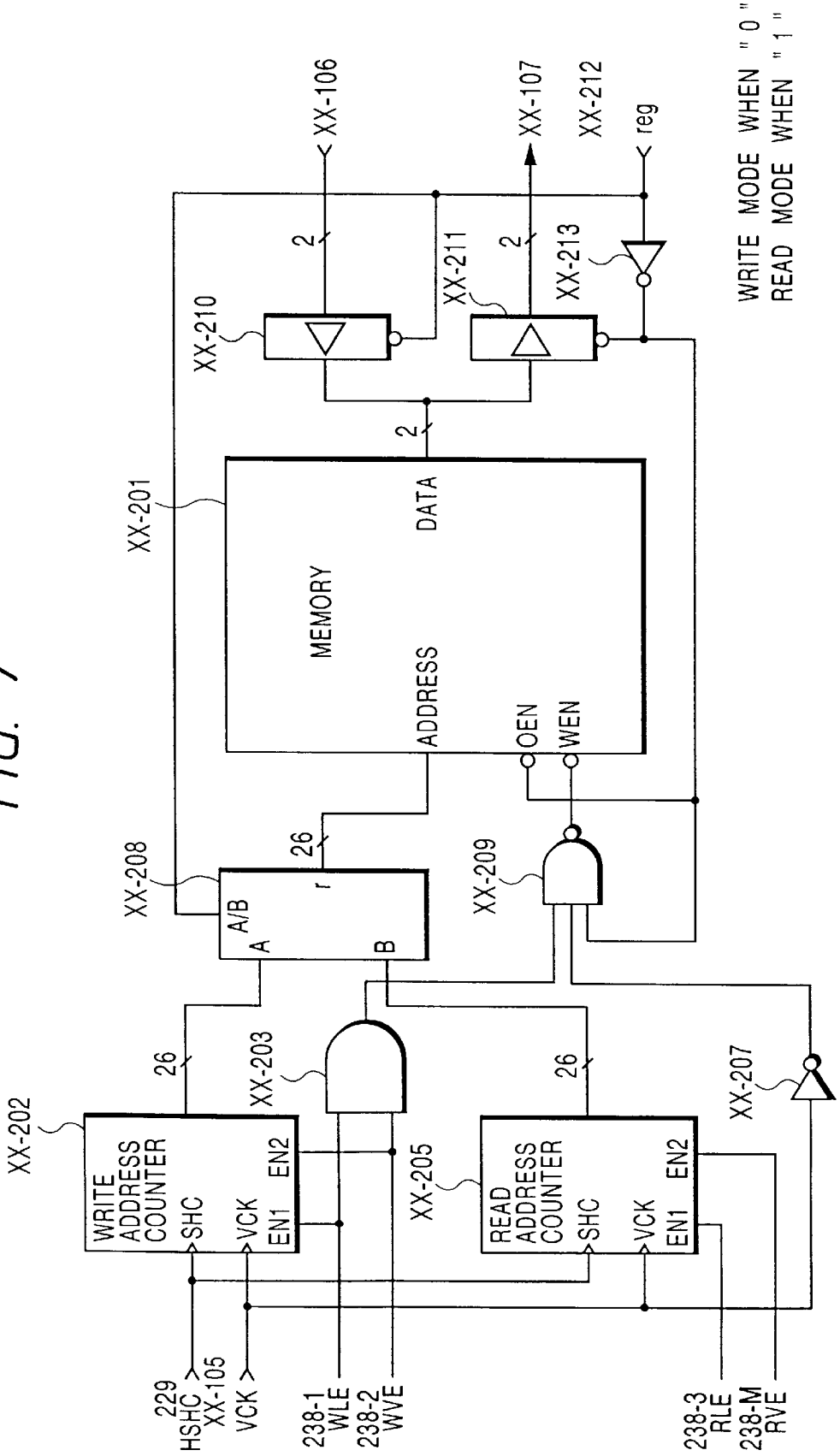
FIG. 7 is a diagram showing an example of a construction of a memory included in the area generation unit-2.

The area generation unit-2 is a circuit to adjust a delay amount which is caused in the image memory unit and, as shown in FIG. 6, it is constructed by four memory units (XX-101 to XX-104) having substantially the same construction except the sub-scan read enable signals (238-M to 238-K) corresponding to the drums of the respective colors. Further, as shown in FIG. 7, the memory unit of each color is constructed by: a memory XX-201; a write address counter XX-202 comprising a main-scan counter which is reset in response to a leading edge of a signal WLE and is counted up at the time of "enable" and a sub-scan counter which is reset in response to a leading edge of a signal WVE and is counted up at the time of "enable"; a read address counter XX-205 comprising a main-scan counter which is reset in response to a leading edge of a signal RLE and is counted up at the time of "enable" and a sub-scan counter which is reset in response to a leading edge of a signal RVE and is counted up at the time of "enable"; an AND gate (XX-203); an inverter XX-213; buffers (XX-210, XX-211); and a register XX-212 which is designated by the CPU 240.

Further, in the memory writing mode,
the register XX-212→0
address→the write address counter selects
XX-210→enable
XX-211→disenable
ONE→1

A signal WEN is set to 0 in response to a trailing edge of a clock and the data in the buffer XX-210 is written into the memory XX-201.

On the other hand, in the memory reading mode, register XX-212→1
address control→the read address counter selects
XX-210→disenable
XX-211→enable
ONE→0
WEN→1

The data in the memory XX-201 is read out through the buffer XX-211. With such a construction, area signals of different timings can be treated like one plane.

The CPU 240 controls the program ROM 241 and work RAM 242 through the CPU bus 243. Data is also set into each image processing unit through a CPU bus in a manner similar to that mentioned above.

Flow of Signals in Each Image Mode

A flow of a video signal in each mode and the setting of an I/O port will now be described with reference to FIGS. 3A and 3B.

Ordinary Copy

A flow of the video signal is as follows.
201→202→203→204→205→206 (A input→C output)
→207→234→208→212→213→214→211→215→216

In this instance, the sub-scan enable signals 221-M to 221-K and 238-M to 238-K are controlled so as to be enable in accordance with an arrangement interval of the color drums.
(Result of RGB system editing process (color conversion) is displayed on the CRT)

A flow of the video signal is as follows.
201→202→203→204→205→206 (A input→B output)
→207→234→208→212→213→214→211→215→217→219

In case of such a mode, since the data which is written into the memory in the image memory unit 208 is rewritten every correction of the edition contents in the preview mode, the original is read each time data is displayed to the CRT (a flow of the video signal is a repetition from 201 mentioned above). In this instance, the sub-scan read enable signals 221-M to 221-K are simultaneously turned on and are simultaneously turned off.

With respect to the print-out after the preview, the optical scan is not performed but only the reading operation from the image memory unit 208 is executed. In this instance, the sub-scan read enable signals 221-M to 221-K are controlled so as to be enable in accordance with the arrangement interval of the color drums.
(Result of the CMYK system editing process (paint, free color) is displayed to the CRT)

A flow of the video signal is as follows.
201→202→203→204→205→206 (A input→C output)
→207→234→208→212→213→214→211→215→217→219

In case of this mode, since the data which is written into the memory in the image memory unit 208 doesn't depend on the edition contents in the preview mode, the optical scan is not performed in the display to the CRT at the second and subsequent times but only the change in edition parameter and the reading operation from the image memory unit 208 are executed (a flow of the video signal is started from 208).

In this instance, the sub-scan read enable signals 221-M to 221-K and 238-M to 238-K are simultaneously turned on and are simultaneously turned off.

With respect to the print-out after the preview, the optical scan is not performed but only the reading operation from the image memory 208 is executed.

In this instance, the sub-scan read enable signals 221-M to 221-K are controlled so as to be enable in accordance with the arrangement interval of the color drums.
(The synthesis result is displayed on the CRT)

(1) A flow of the video signal at the time of the first image writing operation is as follows.
201→202→203→204→205→206 (A input→C output)→207→208

(2) A flow of the video signal when the first image is synthesized with the second image and the synthesized image is again written into the image memory in the image memory unit 208 is as follows.
 (2-1) Output 208 of the memory→212→213→211→214→215→206
 where, the masking UCR unit 212 is set to be "through" and an inverse log table is set into the gamma correction circuit 214.
 (2-2) A flow of the video signal of the reflected original is 201→202→203→204→205→206.

(3) A flow of the output of the synthesis unit is 206→207→208 (writing into the memory) and a flow of the CRT output is 208→212→213→214→211→215→217→219.

Explanation of the Preview Processing Unit

Figure 8:
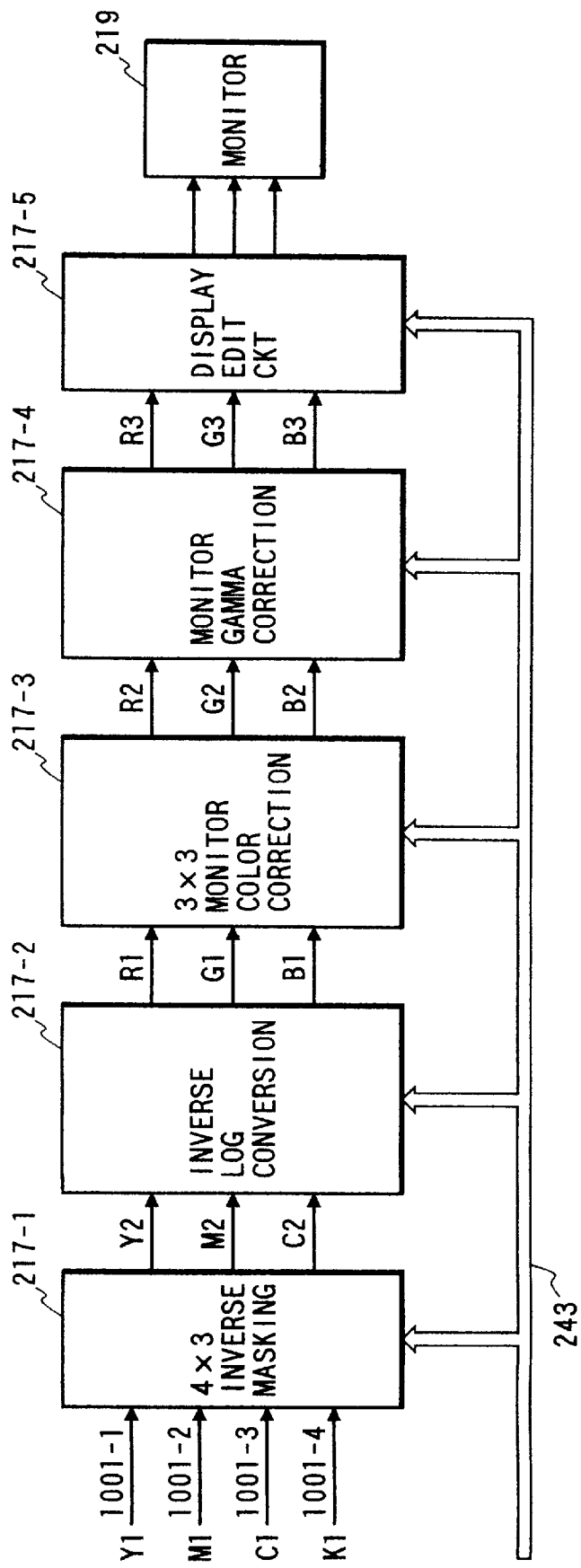
FIG. 8 is a diagram showing an example of a construction of a preview processing unit.

FIG. 8 is a block diagram of a preview processing unit to display the final image obtained by passing the read image data via all of the processing circuits to the CRT 219.

Final image data Y1, M1, C1, and K1 (1001-1 to 1001-4) (each of the Y, M, C, and K data consists of eight bits) which is outputted from the edge emphasis circuit 215 is first inputted to a 4×3 inverse masking correction circuit 217-1 and arithmetic operations of the following equations are executed. In this instance, arithmetic operations opposite to those in the masking UCR unit 212 in FIG. 3B are executed.

$$Y2 = a11*Y1 + a12*M1 + a13*C1 + a14*K1$$

$$M2 = a21*Y1 + a22*M1 + a23*C1 + a24*K1$$

$$C2 = a31*Y1 + a32*M1 + a33*C1 + a34*K1$$

Coefficients a11 to a34 can be set to arbitrary values from the CPU 240 via the CPU bus 243, respectively. The information of four colors (Y1, M1, C1, K1) is converted here into information Y2, M2, and C2 of three colors and is inputted to an inverse log conversion correction circuit 217-2. The correction circuit 217-2 is constructed by an LUT in order to perform arithmetic operations opposite to those of the log conversion circuit 207 in FIG. 3A. Arbitrary correction data can be set by the CPU in a manner similar to the above. By the above arithmetic operations, although the density data of YMCK is converted into the luminance data and can be displayed to the CRT or the like, since there are many kinds of CRTs to be connected and there are also various color reconstruction ranges, means for adjusting them is needed. A subsequent 3×3 monitor color correction circuit 217-3 is provided to correct color characteristics of the monitor and arithmetic operations of the following equations are executed.

$$R2 = b11*R1 + b12*G1 + b13*B1$$

$$G2 = b21*R1 + b22*G1 + b23*B1$$

$$B2 = b31*R1 + b32*G1 + b33*B1$$

In this instance, arbitrary coefficients are also set by the CPU 240 in a manner similar to the case of the inverse masking circuit 217-1.

A monitor gamma correction circuit 217-4 is provided to correct monitor gamma characteristics and arbitrary correction data can be set by the CPU 240.

A display edit circuit 217-5 is provided to perform various editing processes when displaying data to the monitor and to control the monitor.

Figure 9:
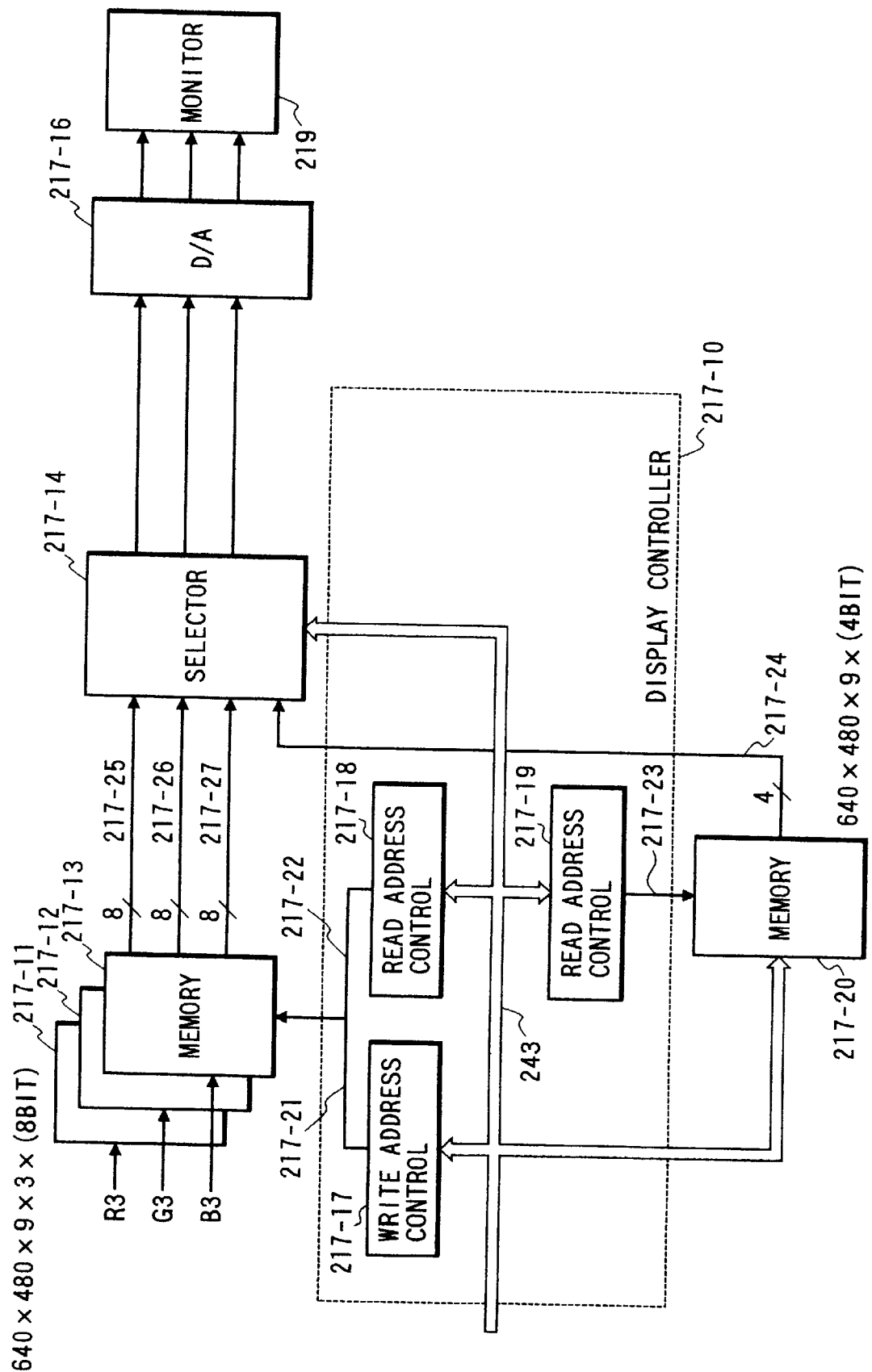
FIG. 9 is a diagram showing an example of a construction of a display edit circuit.

FIG. 9 is a detailed explanatory diagram of the display edit circuit. The display edit circuit is mainly constructed by: a portion to process the read image; and a portion to generate additional information such as frame, characters, cursor, or the like to the image.

Data of R3, G3, and B3 after completion of the monitor gamma correction by the monitor gamma correction circuit 217-4 is connected to memories 217-11, 217-12, and 217-13, respectively. Start addresses and end addresses in the X and Y directions can be set from the CPU bus 243 so that the writing operation can be performed from an arbitrary position in the memory by an address signal 217-21 from a write address control unit 217-17 in a display controller 217-10. In the embodiment, a size of memory is constructed by a capacity as much as three colors of 640×480×9×(8 bits).

When writing into the memory, data can be reduced in accordance with the original image size and written and a reduction magnification in this case can be set by the CPU 240. Further, the data size is controlled by the write address control unit 217-17 so that the data can be arbitrarily rotated in accordance with whether the image size to be displayed is vertically long or laterally long. At this time, with respect to areas other than the start/end addresses, namely, areas in which no image is written, since a previous image remains or a display color is fixed, a display color in the portion other than the write area can be set by the CPU 240 so that data can be displayed in an arbitrary color.

After the data was written into the memory, in order to designate from which portion in the memory the data should be read out in order to display to the monitor, arbitrary coordinates can be designated into a read address control unit 217-18 by the CPU. In this instance, they can be displayed in a real-time manner by a touch panel of a console unit, which will be explained hereinlater. Since the image size of the monitor in the embodiment is set to 640×480 dots, in order to display the entire image stored in the memory, it is necessary to thin out the image and display. A thinning-out ratio can be set by the CPU 240. In the embodiment, as will be explained hereinlater, the operator can select any one of an entire mode to display the entire image stored in the memory, a 2-times mode to display the image of ⅑ of the image stored in the memory, and a 3-times mode to display the image of ⅑ of the image stored in the memory.

A memory 217-20 is provided to add various figures or characters to the image information separately to the image information and has a size of 640×480×9 (4 bits). Namely, different figures, characters, cursors, or the like corresponding to four picture planes can be independently developed. On the basis of the control of the CPU 240, the images developed in the memory 217-20 are read out so as to be synthesized by a read address control 217-23 to an arbitrary position of the image to be displayed to the monitor.

For example, the cursors indicating a conversion color and a post-conversion color, which will be explained hereinlater, is read out on the basis of an operation from the console unit.

In the embodiment, although the above information has directly been developed in the memory by the CPU 240, in order to develop the information at a high speed, for example, the information can be transmitted through an exclusive-use controller like an AGDC (made by NEC Corporation). A read address control unit 217-19 can set a read start position and a thinning-out ratio in a manner similar to the foregoing read address control unit 217-18.

The data read out from each of the above memories is sent to a selector 217-14. In the selector, in response to the signal read out from the memory 217-20, when a signal 217-24 is at the low (L) level, image data 217-25 to 217-27 is outputted as it is. When the signal 217-24 is at the high (H) level, the data of R, G, and B (each consisting of eight bits) which is set by the CPU 240 in accordance with each development image is outputted. Namely, the data of R, G, and B can be set by the CPU 240 and arbitrary colors can be added to the figures, characters, cursors, etc. drawn in the four picture planes.

The signals processed by the selector 217-14 are converted into analog signals for monitor by a D/A converter 217-16 and outputted to the monitor 219.

With Respect to the Console Unit

Figure 20:
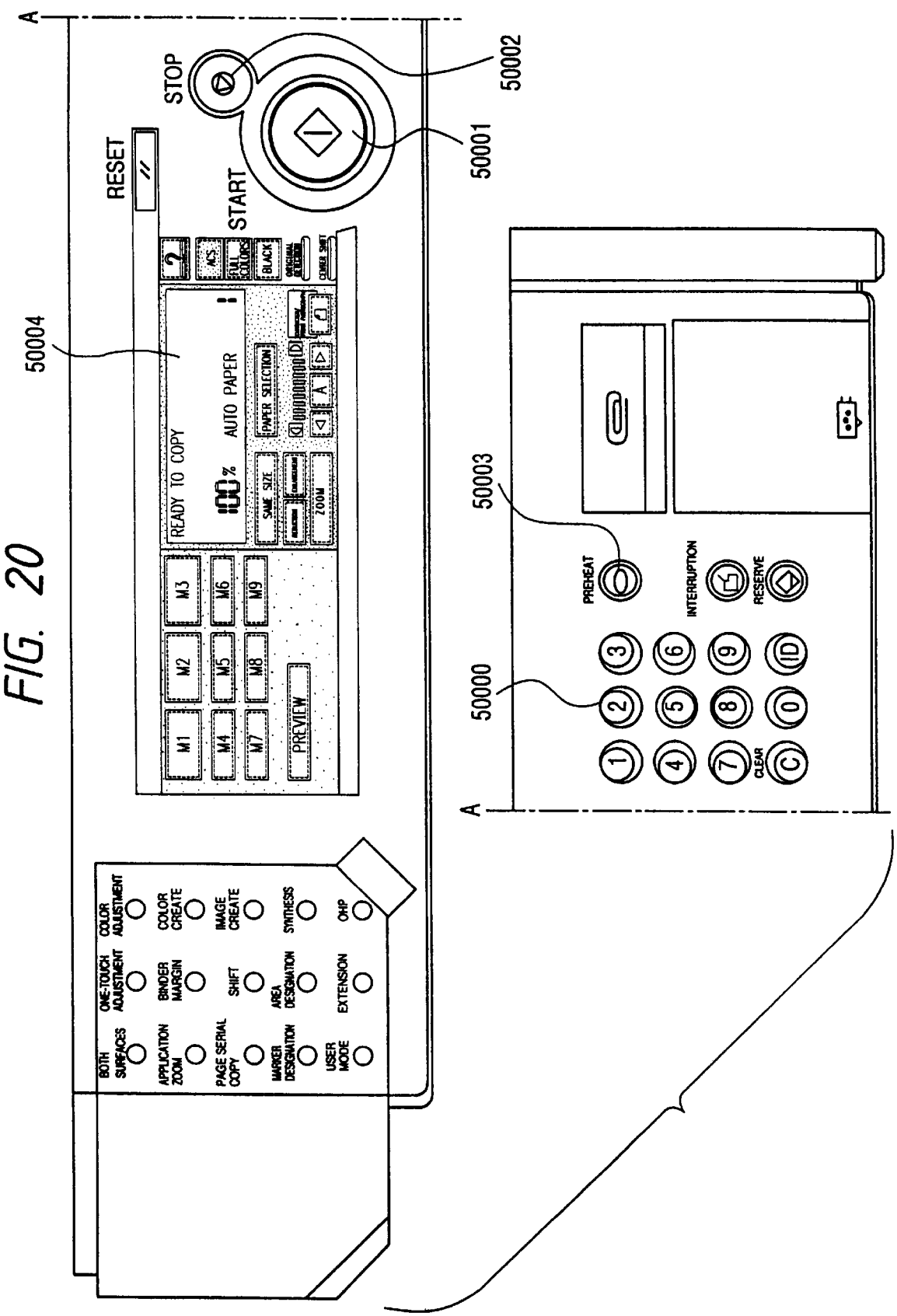
FIG. 20 is a diagram showing an example of a display of an operation picture plane.

FIG. 20 is an external view of the console unit. Reference numeral 50000 denotes a registration key; 50001 a copy start key; 50002 a stop key; 50003 a preheat key; and 50004 a display unit comprising a liquid crystal display and a touch panel.

Figure 21:
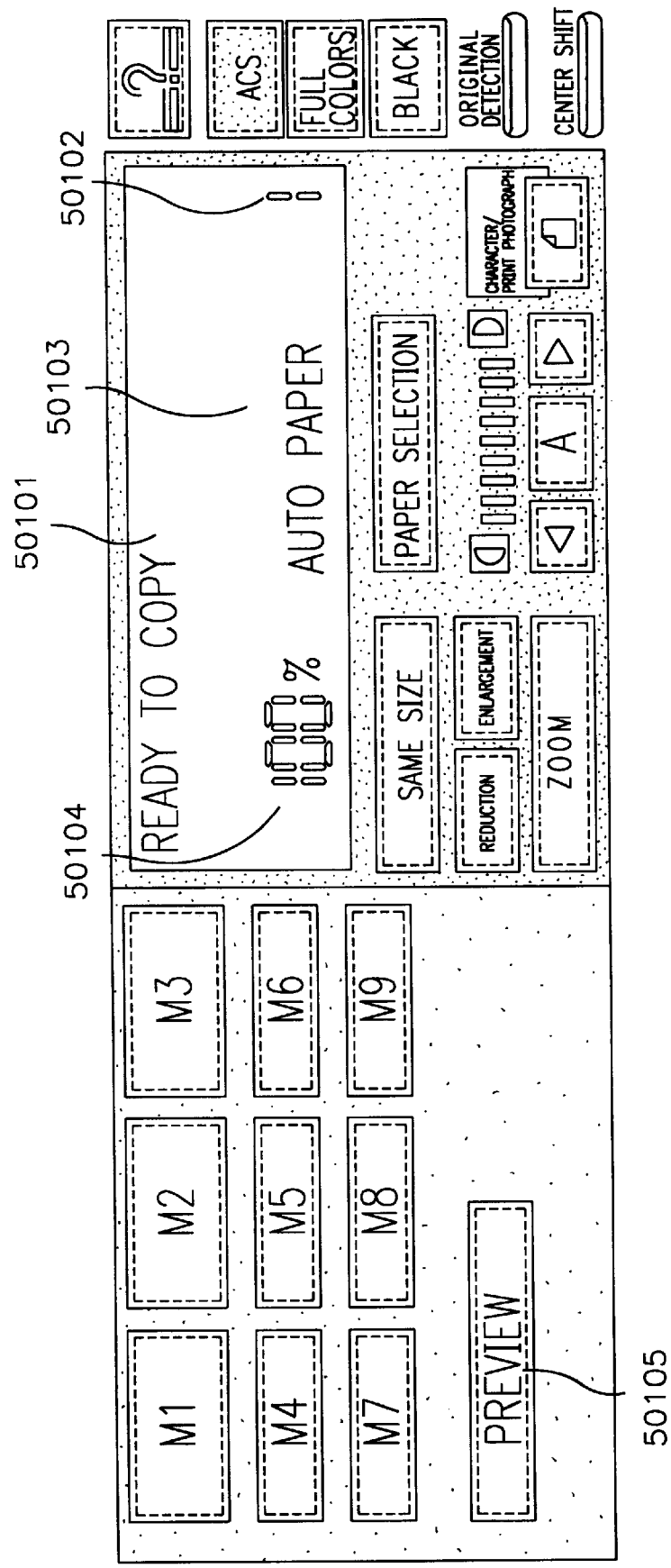
FIG. 21 is a diagram showing an example of a display of an operation picture plane.

FIG. 21 shows a standard picture plane of the display unit 50004.

In each display of the standard picture plane of FIG. 21, reference numeral 50101 denotes "ready to copy"; 50102 "set copy quantity"; 50103 a selected paper size; 50104 a selected copy magnification; and 50105 a touch key to instruct a preview mode.

Prior to starting the preview process, the operator designates an image magnification, a paper size, and an editing process from the console unit and depresses the preview mode key 50105. The picture plane of the display unit is shifted from the standard picture plane to a preview operation picture plane.

Figure 22:
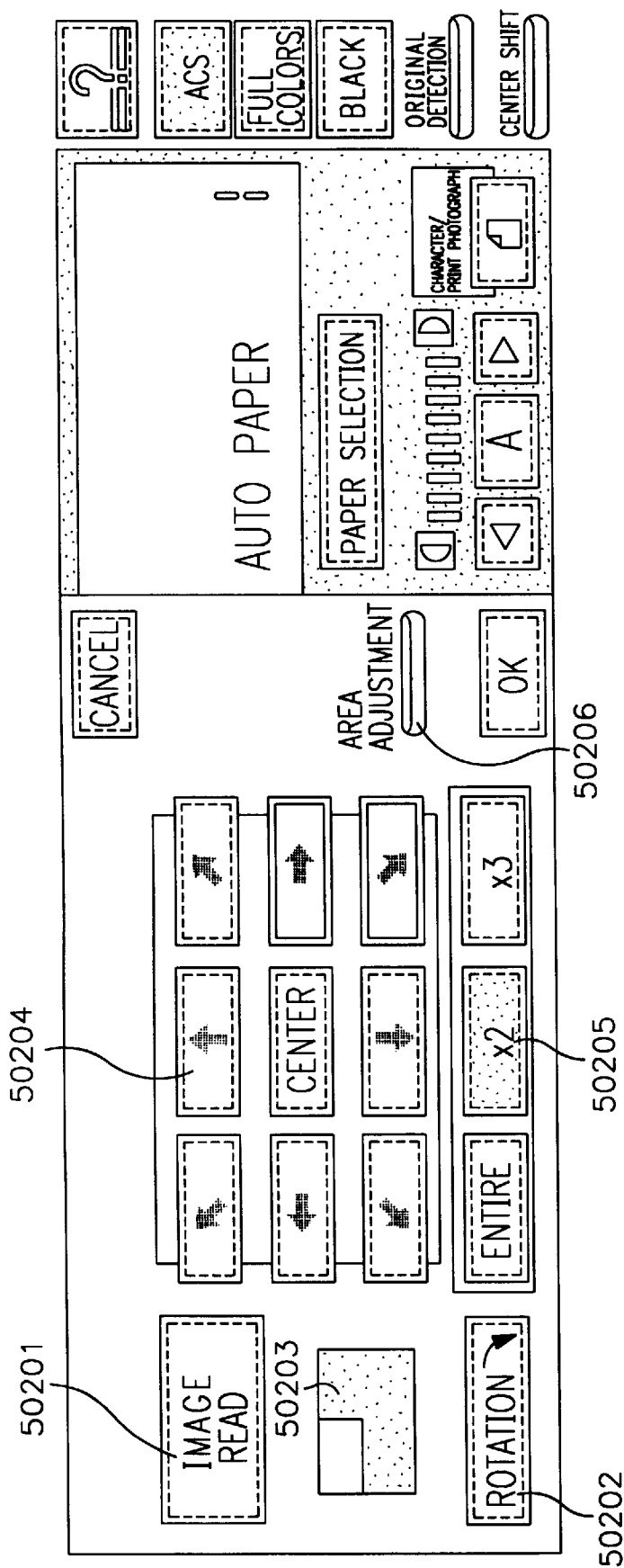
FIG. 22 is a diagram showing an example of a display of an operation picture plane.

FIG. 22 shows an example of the preview operation picture plane. Reference numeral 50201 denotes a preview start key (image read key) to read an original to be previewed; 50202 a display direction setting key to set the direction when displaying an image to the CRT 219; 50203 an area monitor to indicate which portion of the image is displayed; 50204 a display position setting key to set which portion of the image is displayed; 50205 a display magnification setting key; and 50206 an area adjustment key.

The operator first sets the original to an original supporting glass plate or a feeder 11 and sets the display direction (vertical or lateral) by the display direction setting key 50202. As for the front page direction, an image from an original confronting position of the original supporting glass plate is ordinarily displayed from the right upper position of the CRT 219. When the display direction setting key 50202 is depressed, the display of the display direction setting key is inverted to a black display and the image which was rotated by 90° is written into the display memories 217-11 to 217-13, so that the image from the original confronting position of the original supporting glass plate is rotated by 90° and is displayed on the CRT 219.

When the operator depresses the preview start key 50201, if the original is set to the feeder, the original is sent from the feeder to the original supporting glass plate. Further, when an original detecting mode is set, a prescan is executed to detect an original size and a putting position of the original put on the original supporting glass plate. After that, a scanning operation to read the image is subsequently started and the reading operation of the image is started. After various editing processes set were performed to the read image, the image signal after completion of the editing processes is sent to the preview processing unit 217 and is converted into RGB signals. After that, a most efficient size at which the entire image can enter the areas in the memories 217-11 to 217-13 is calculated on the basis of the display direction, display magnification, original size, and the like which were set and the data is written. The data in the image memories 217-11 to 217-13 is corrected in accordance with the characteristics of the CRT by the LUT 217-4. The data is transferred to the CRT by the display controller 217-10 and a preview image is displayed.

Each of the image memories 217-11 to 217-13 has a size of 1920×1440 pixels that is nine times as large as the display size (640×480 pixels) of the CRT. Therefore, when the data is transferred from the image memories to the CRT, it is necessary to variably magnify the data in the image memories 217-11 to 217-13 by the display controller 217-10 on the basis of the display size of the CRT and the display magnification set by the display magnification setting key 50205 and to transfer the data to the CRT.

Figure 26:
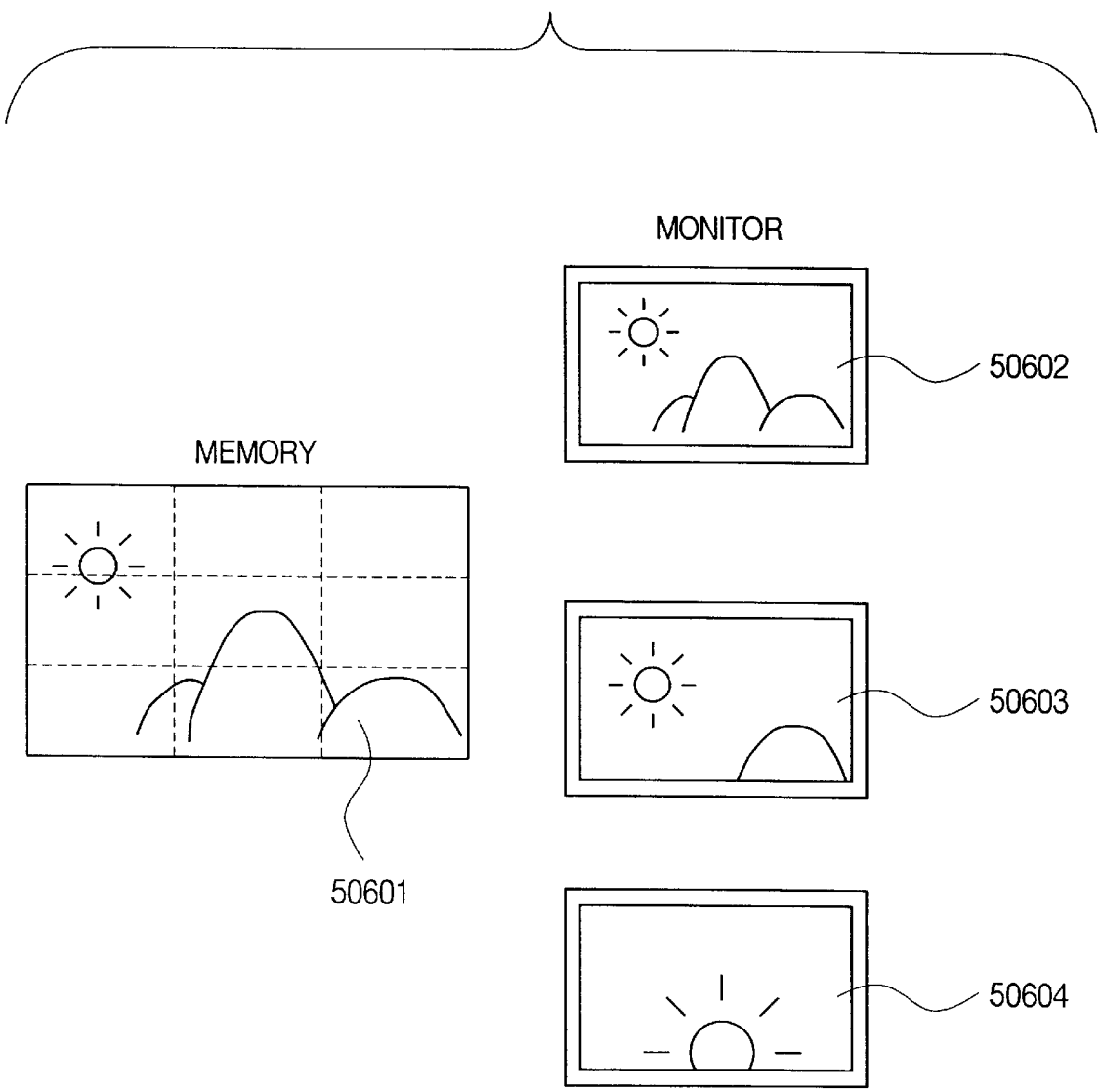
FIG. 26 is a diagram showing an example of a preview image.

FIG. 26 shows a specific example. Data shown at 50601 has been written in the image memories 217-11 to 217-13. In this instance, when a display magnification "entire" is set by the display magnification setting key, the entire data areas of the image memories 217-11 to 217-13 are reduced into ⅑ by the display controller 217-10 and is displayed as shown at 50602 to the CRT. When a 2-times key of the display magnification setting key is depressed, the data in the areas of 4/9 of the image memories 217-11 to 217-13 is reduced into ¼ by the display controller and is transferred and is displayed as shown at 50603 to the CRT. Namely, a part of the image memories 217-11 to 217-13 is enlarged to two times as large as that in the entire display and is displayed. When the operator depresses a 3-times key as well, by transferring the data in the areas of ⅑ of the image memories 217-11 to 217-13 to the display memory at an equal magnification, a part of the image is enlarged to three times as large as that in the entire display as shown at 50604 and is displayed.

When 2-times or 3-times is set by the display magnification setting key, since a part of the image of the image memories 217-11 to 217-13 is displayed on the CRT, by changing the reading position in the memory area and transferring the data to the CRT, a portion which is not displayed on the CRT can be displayed. Namely, when 2-times is set by the display magnification setting key, the image of an arbitrary size of ¼ of the image memory is displayed on the CRT. In this instance, each time a downward direction arrow key of a display position setting key 50304 is depressed, the reading start position in the image memory is shifted downward by a distance of 4 dots and the image of the size of ¼ from such a position is transferred to the CRT, so that the image in the lower portion of the picture plane which is not displayed on the CRT can be displayed. In this instance, when a part of the memory reading area is an edge portion of the memory, if the reading start position is subsequently moved in the direction of the edge portion, such a position is out of a range of the image memory. Therefore, in order to allow the operator to recognize a fact that the reading start position cannot be shifted any more in the upper edge portion direction, the display position setting key in the edge portion direction is displayed as a mesh region and no key sense can be performed. When the image is shifted, in order to enable the operator to recognize which area in the memory is displayed on the CRT, the area of the image displayed on an area monitor 50302 is shown.

With Respect to Area Correction by Preview

When the operator sets an area designation before performing the preview, the preview image which was area processed can be displayed. When a position and a size of the area of the processed image are deviated from desired ones or when a hue of the processed image is slightly different from that of the designated area, a fine adjustment of the position and size of the designated area and a correction of the processing contents can be corrected on the preview picture plane.

Figure 27:
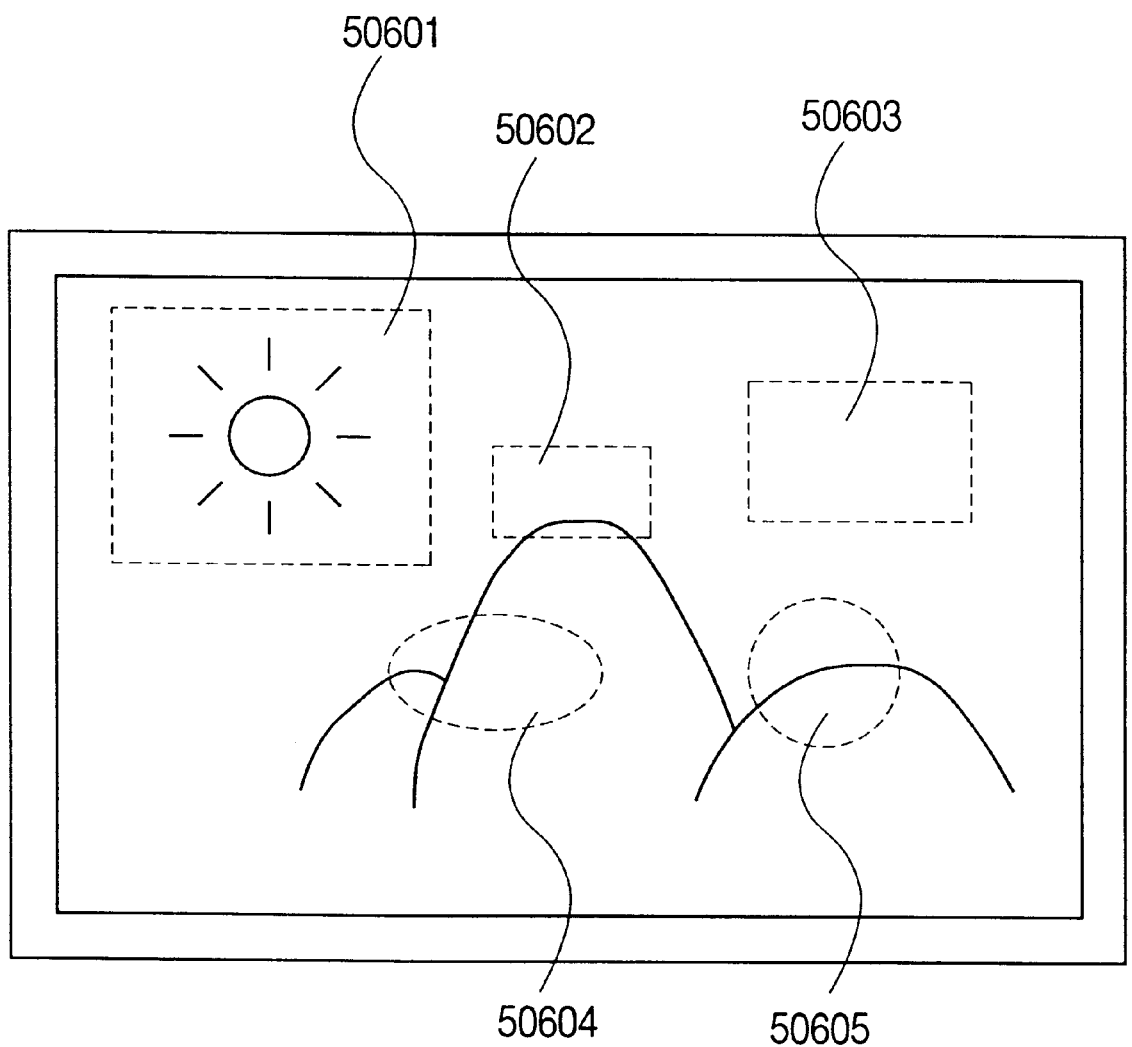
FIG. 27 is a diagram showing an example of a preview image.
Figure 28:
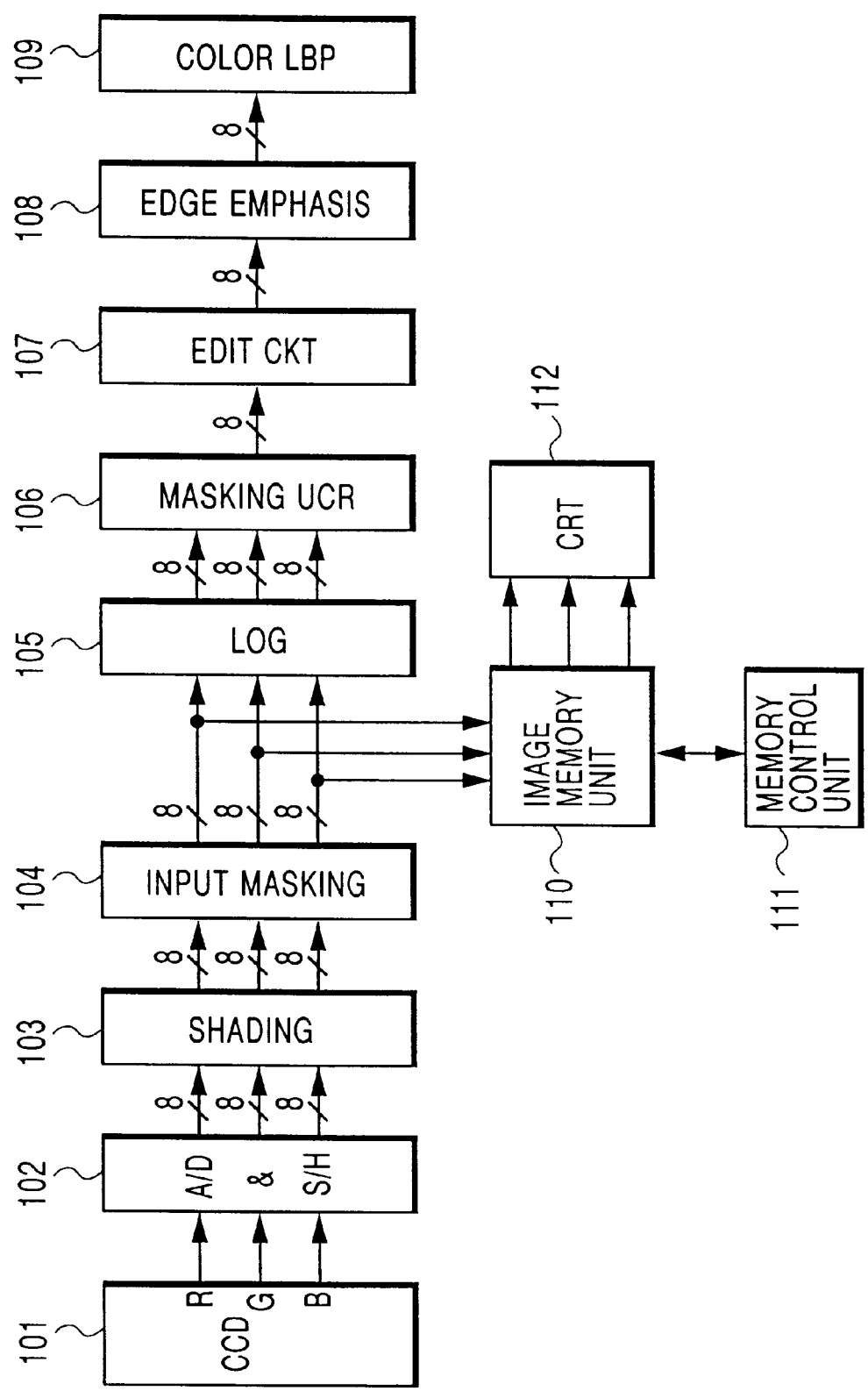
FIG. 28 is a diagram showing a construction of a conventional image processing apparatus.

After the preview was performed, when the operator depresses the area adjustment key 50206, the display unit displays an area selection picture plane. When the picture plane is shifted to the area selection picture plane, as shown in FIG. 27, a size and a position of an outer frame of the entire area set by an area designating function are calculated on the basis of a copy magnification, a display magnification, a display direction, and the like and the outer frame of the area is generated by the area generation unit-2 (230). The outer frame of the area generated is developed in an image memory-1 for area (hereinafter, referred to as a plane memory-1) and is further transferred to a display memory-1 for area (hereinafter, referred to as a plane memory-1') and is displayed on the CRT. In this instance, the outer frame of the area is displayed on the preview image displayed at present. The outer frame of the area is displayed in a display color set in the plane memory-1. The foregoing plane memory is a memory obtained by dividing the memory 217-20.

The plane memory-1 has a capacity of a few times as large as the pixel size of the CRT. In a manner similar to the preview image, a transfer area and a transfer magnification of the plane memory-1 are calculated from the values of the magnification set by the image magnification setting key and the display position set by the display area setting key and are transferred to the plane memory-1'. Therefore, each time the set values of the image display magnification and display area are changed, the area is again displayed so as to follow the preview image.

In the area process, maximum 30 processing contents can be set and maximum 15 areas can be set every process. For example, FIG. 27 shows an example of a preview image when a plurality of areas are designated. As an area process-1, a painting process is executed to three areas of 50701 (area-1), 50702 (area-2), and 50703 (area-3). As an area process-2, a color converting process is executed to two areas of 50704 (area-4) and 50705 (area-5). When a plurality of areas are set as mentioned above, the operator needs to specify the area by an area processing number setting key and an area number setting key.

Figure 23:
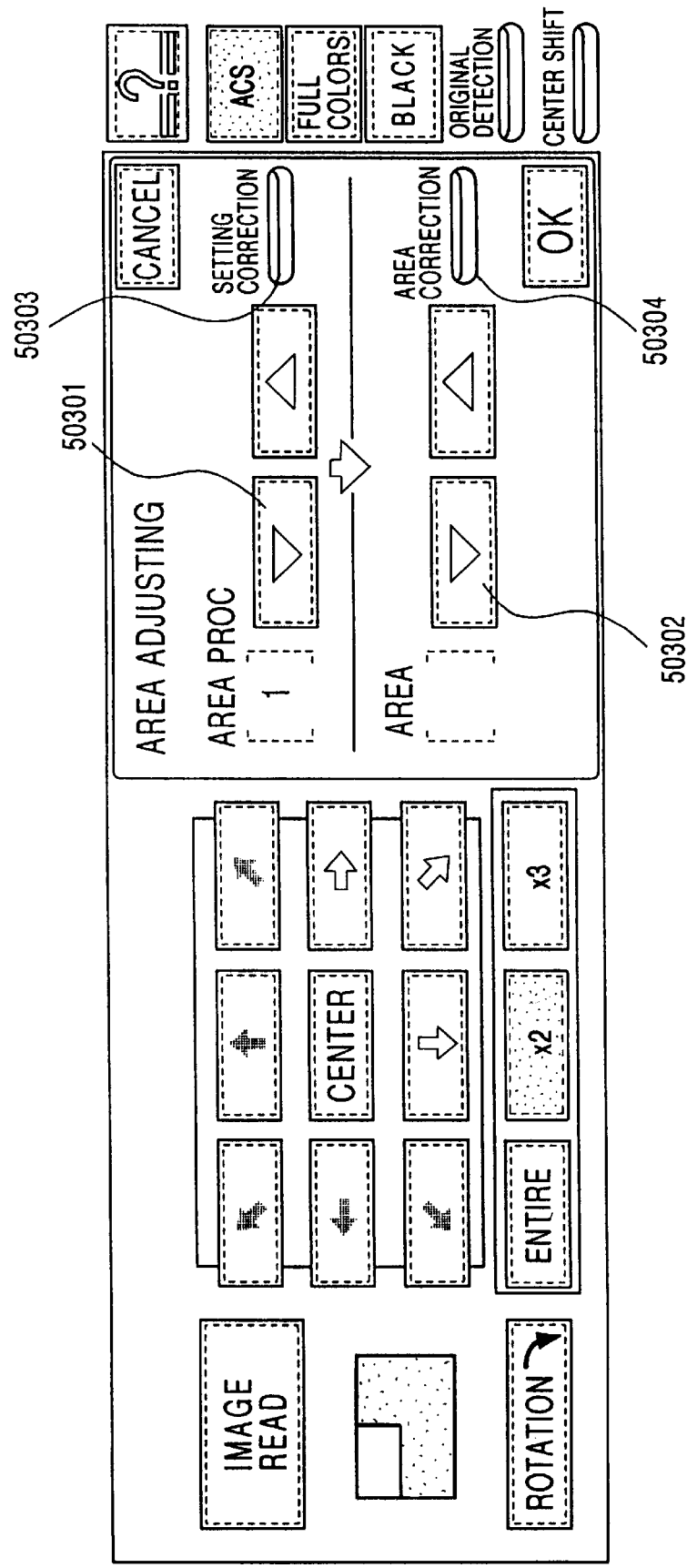
FIG. 23 is a diagram showing an example of a display of an operation picture plane.

First, when the operator depresses the area adjustment key 50206 in FIG. 22, a picture plane of FIG. 23 is displayed. By depressing an UP key and a DOWN key of an area processing number setting key 50301, a desired area processing number is selected. Now, assuming that the area process-1 is selected, the outer frames (50701, 50702, 50703) of the area included in the area process-1 are calculated by a similar procedure and formed in an image memory-2 for area (hereinafter, referred to as a plane memory-2) by the area generation unit-2 (230). The data is variably magnified by the magnification designated by the display magnification setting key and is transferred to a display memory-2 for area (hereinafter, referred to as a plane memory-2'), thereby displaying the data on the CRT in a color different from the display color displayed in the plane memory-1'. Since the display colors set in the plane memory-1' and plane memory-2' are different, the designated area process can be recognized from among the plurality of set area processes by the display color on the CRT. Further, when the area processing No. 2 is designated by selecting the UP key of the area processing number setting key 50301, the outer frame of the area included in the area process-1 written in the plane memory-2 is deleted and the outer frame of the area included in the area processing No. 2 is written and is displayed on the CRT.

Figure 24:
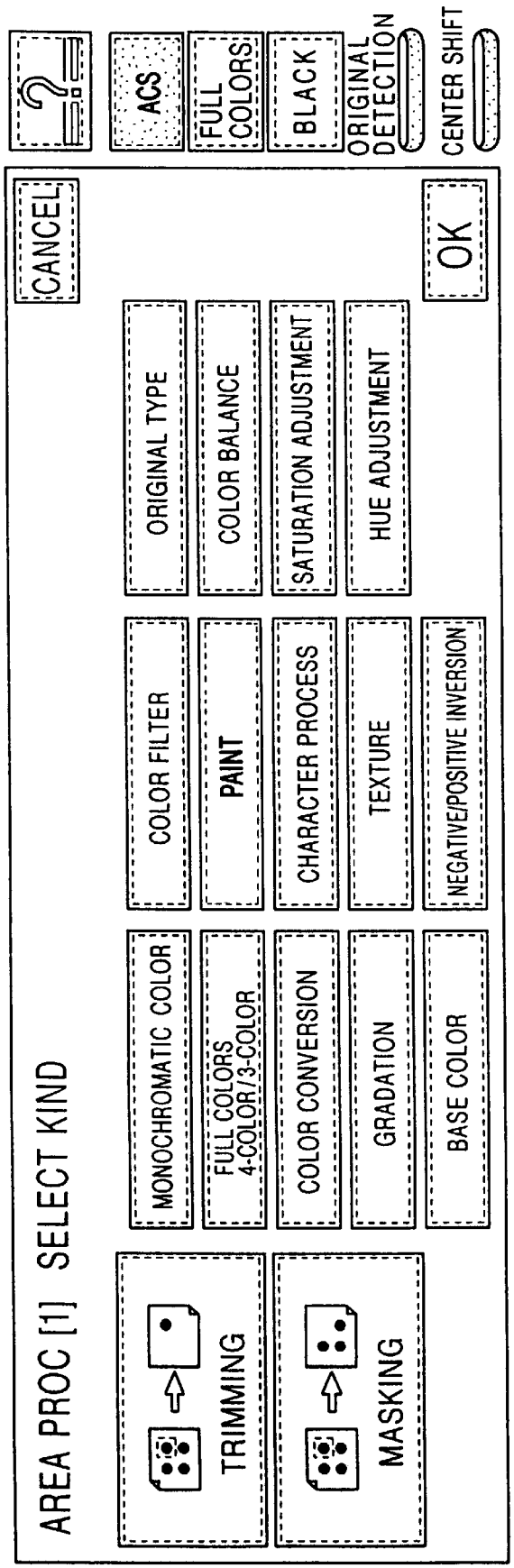
FIG. 24 is a diagram showing an example of a display of an operation picture plane.

As mentioned above, when the operator specifies the area process in which he wants to change the processing contents and depresses a setting correction key 50303, a picture plane shown in FIG. 24 is displayed. By selecting desired processing contents on the picture plane, the processing contents are fed back and can be changed.

When the size of area is subsequently changed, first, the number of a desired area process including an area to be changed is selected by the area processing number setting key 50301 and the area is selected by an area number selecting key 50302 in accordance with the procedure mentioned above. For example, when the area-5 (50705) of the area process-2 is shifted to the left by 1 cm, the area process-2 is first selected by the area processing number setting key. Subsequently, when the area number setting key is depressed, the area-4 (50704) included in the area process is selected. In this instance, the outer frame of the area-4 is developed in an image memory-3 for area (hereinafter, referred to as a plane memory-3) from the area generation unit 229. The data developed in the plane memory-3 is transferred to a display memory-3 for area (hereinafter, referred to as a plane memory-3') and is displayed on the CRT. In this instance, the colors in the plane memory-1' and plane memory-2' which are displayed on the CRT are different. Since the display memories have the priorities of plane memory-1'<plane memory-2'<plane memory-3', even if the operator doesn't remember the number of the area to be corrected, he can recognize the designated area process from among the processes of all of the areas on the CRT and, further, can recognize the desired area among them.

When the area-5 (50705) is subsequently set by the area number setting key, the outer frame of the area of the area-4 (50704) in the plane memory-3' is deleted and the outer frame of the area-5 is written into the plane memory-3 and is displayed on the CRT.

After the area in which the operator wants to change the area size was designated, when the operator depresses the area correction key 50304, an area size change picture plane is displayed.

Figure 25:
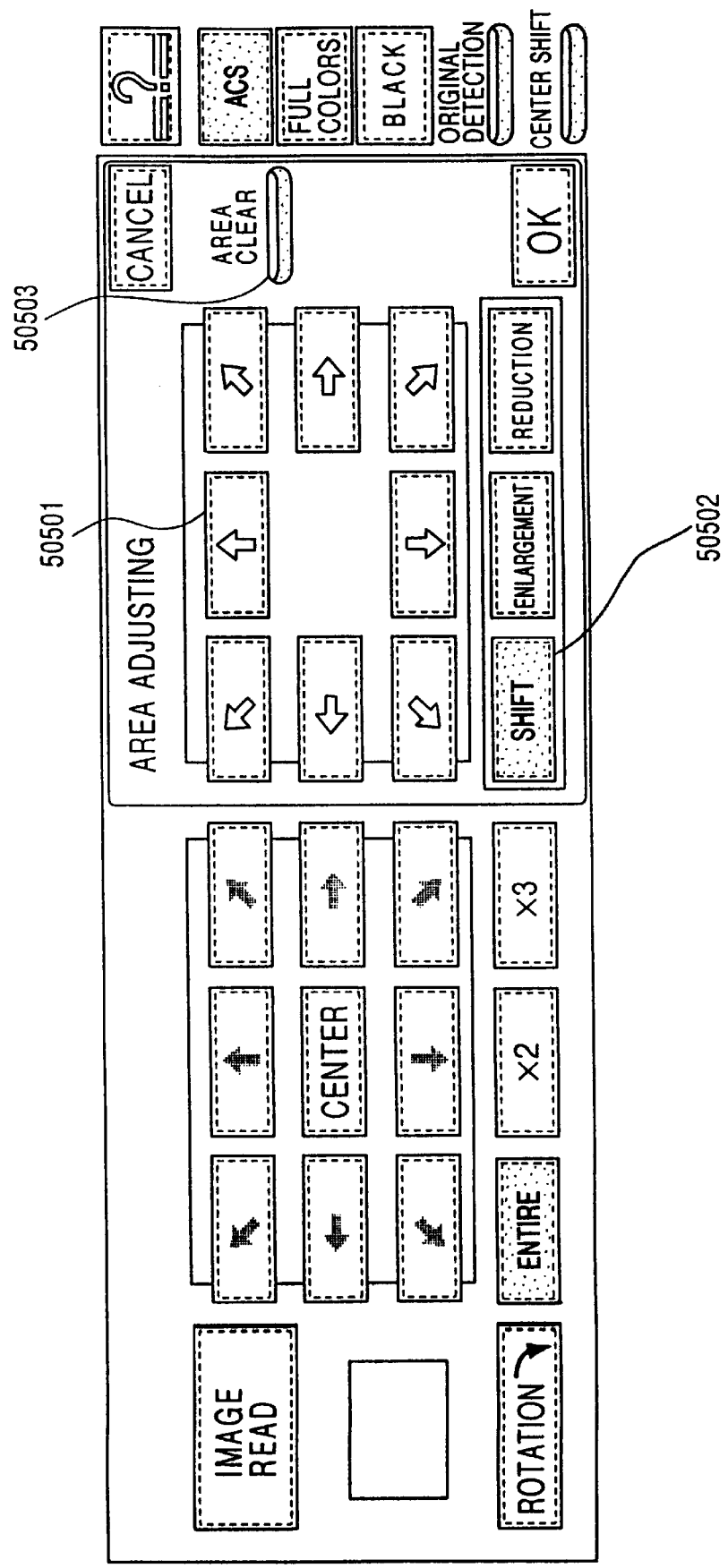
FIG. 25 is a diagram showing an example of a display of an operation picture plane.

FIG. 25 shows the area size change picture plane. In FIG. 25, reference numeral 50501 denotes an area correction key to instruct the moving direction of the area; 50502 an area correction setting key to set the kind of correction of the area; and 50503 an area clear key.

For example, when the operator wants to shift the area-5 to the left, the shift is designated by the area correction setting key 50502. A left arrow key of the area correction key 50501 is depressed. In this instance, the outer frame of the area-5 displayed in the plane memory 3 is cleared. The outer frame of the area which was shifted to the left by a distance of four pixels is formed in the plane memory-3 and is transferred to the plane memory-3' and is displayed on the CRT. Thus, the designated area is shifted on the preview image. Moreover, since the shift amount is fed back to the CPU, when an image reading key is again depressed and the preview is again performed, the area is processed at the position of the area which was shifted and adjusted. As mentioned above, the area can be shifted while comparing the preview image with the designated area. Even when the area size is changed, an enlargement or reduction is similarly set by the area correction setting key 50502, the area correction key 50501 is depressed, and an arbitrary area size is set. The area is expanded or reduced in the direction of the depressed key.

As mentioned above, the size, position, and contents of the area are corrected while comparing with those of the preview image. When a desired image of the operator can be displayed on the CRT, the start key 50001 is depressed and the image is formed by the printer.

Color Converting Process

Figure 10:
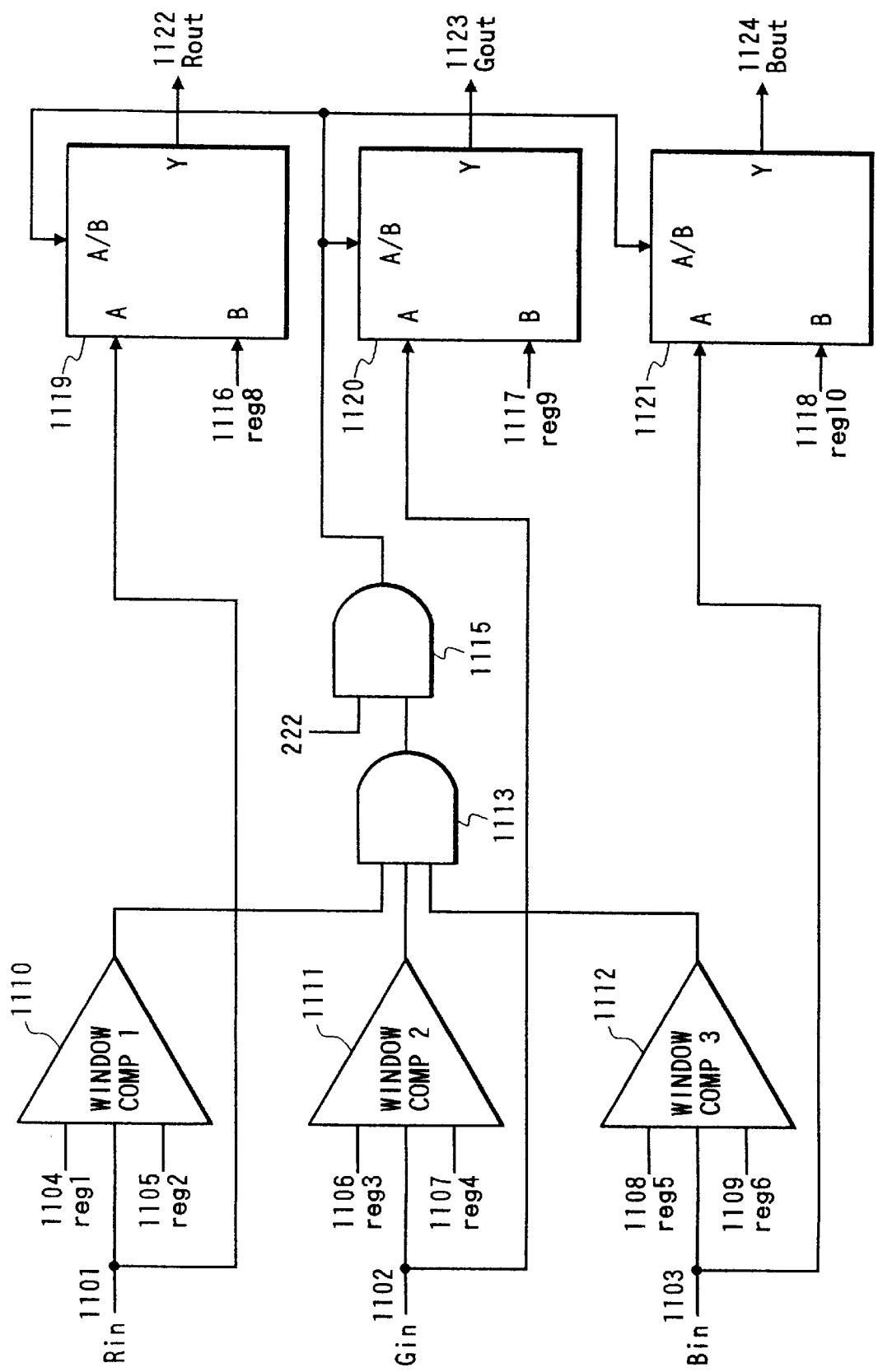
FIG. 10 is a diagram showing an example of a construction of a color conversion circuit.

FIG. 10 is a block diagram for explaining a color converting process.

A color conversion processing unit is divided into a detection unit and a conversion unit.

The detection unit is constructed by three window comparators (1110, 1111, 1112), two AND gates (1113, 1115), and registers (1104 to 1109 which are set by the CPU 240) to control the foregoing comparators and gates. As for the operation, when reg1 ≦ input video R (1101) ≦ reg2
reg3 ≦ input video G (1102) ≦ reg4
reg5 ≦ input video B (1103) ≦ reg6 outputs of the three window comparators 1110 to 1112 and two AND gates 1113 and 1115 are set to "1" and only a certain characteristic color is detected (however, area signal 222 is set to "1").

On the other hand, the conversion unit is constructed by three selectors (1119, 1120, 1121) and registers (1116 to 1118). When the output of the AND gate (1115) is set to the "1" level, values of the registers (1116 to 1118) which are set by the CPU 240, namely, conversion colors are outputted (1122 to 1124). When it is set to the "0" level, the inputted video signals (1101 to 1103) are outputted as they are.

Figure 4:
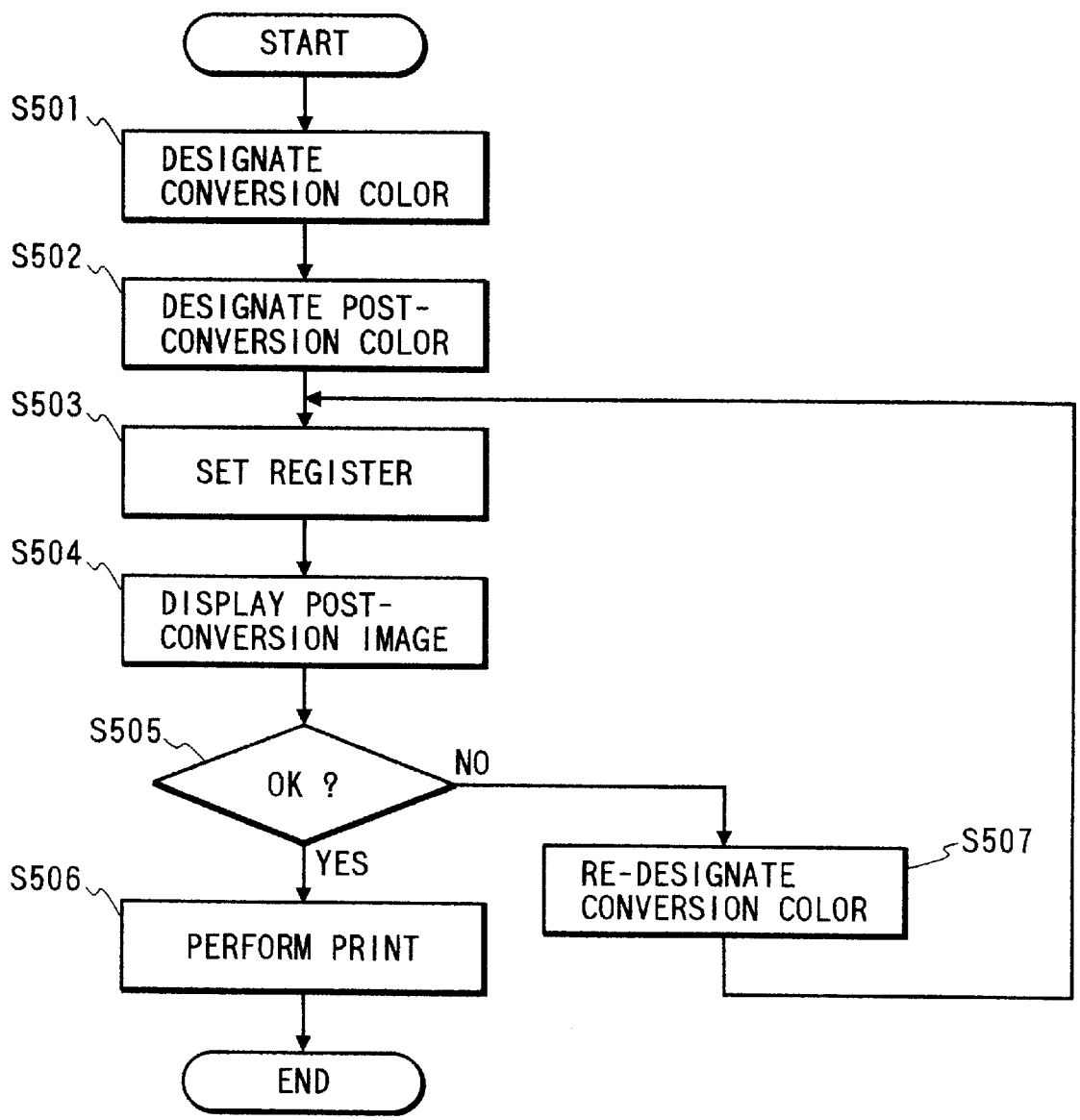
FIG. 4 is a diagram showing an example of a flow of a color converting process.

In the image processing apparatus with the construction as mentioned above, a method of performing the color converting process by using the preview system will now be described with reference to a flowchart of FIG. 4.

Figure 11:
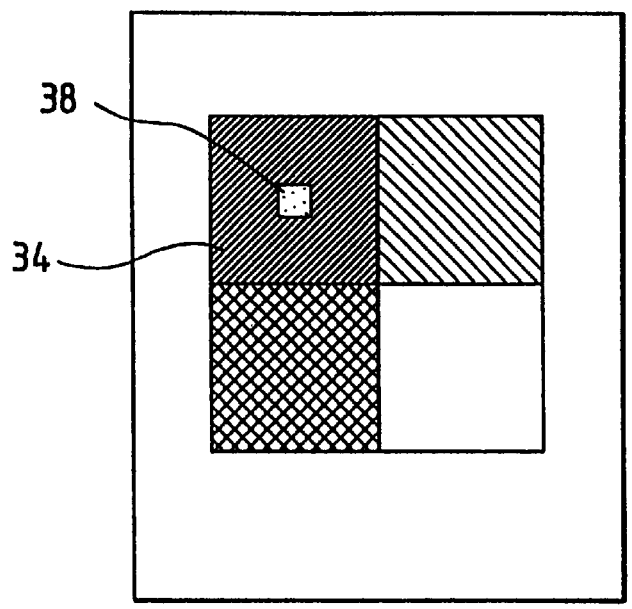
FIG. 11 is a diagram showing an example of a preview image in a color conversion.
Figure 12:
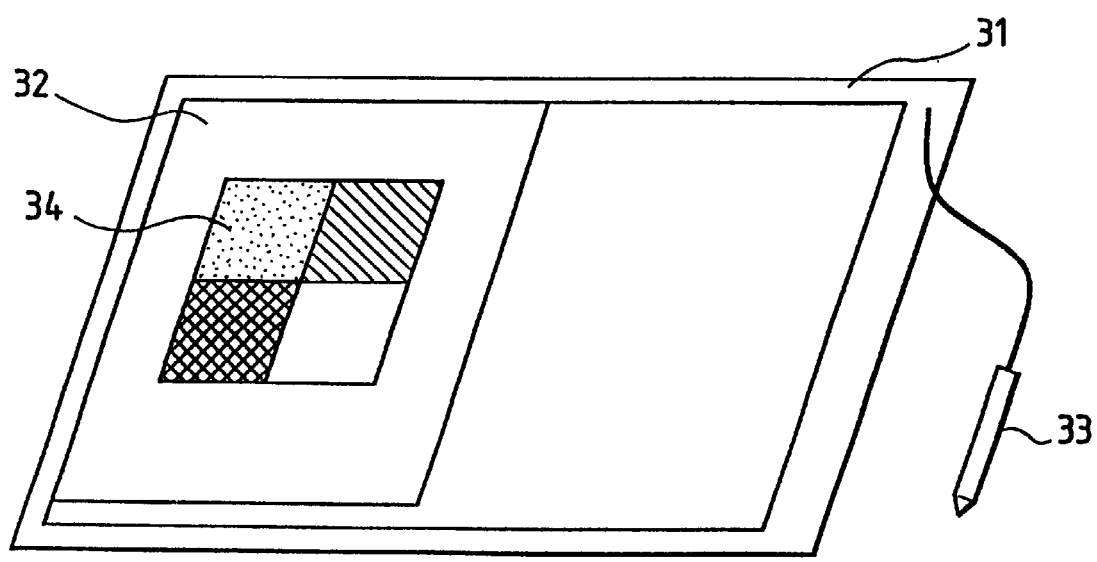
FIG. 12 is a diagram showing an example of a construction of a digitizer.
Figure 13:
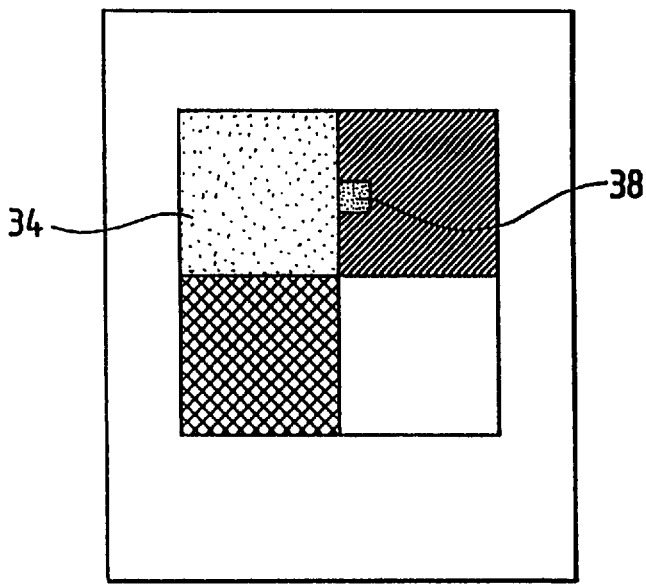
FIG. 13 is a diagram showing an example of a preview image in the color conversion.
Figure 14:
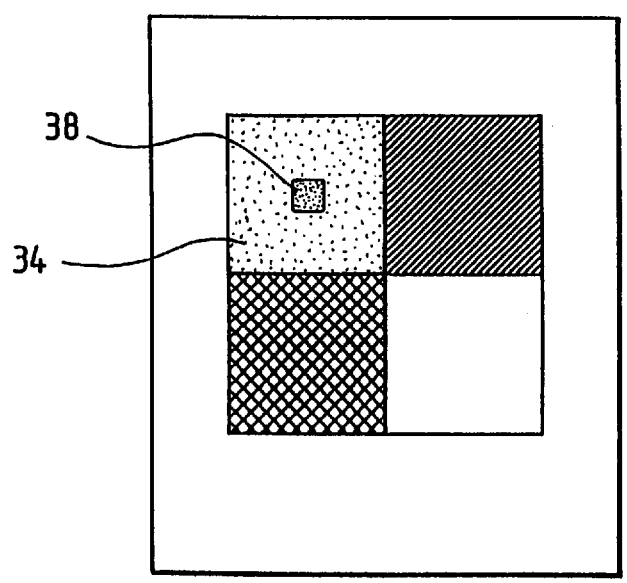
FIG. 14 is a diagram showing an example of a preview image in the color conversion.
Figure 19:
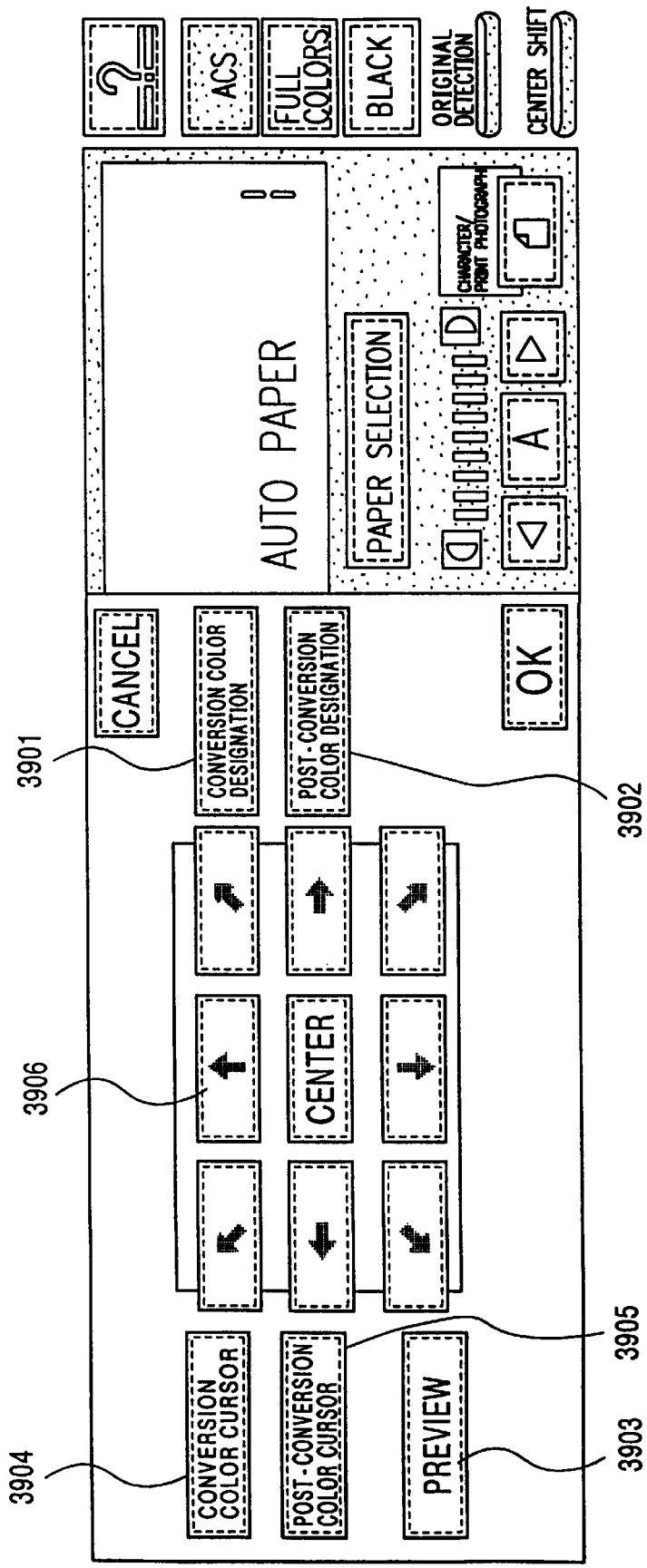
FIG. 19 is a diagram showing an example of a display of an operation picture plane.

When the operator selects a color conversion mode by a switch of the console unit shown in FIG. 24, an operation picture plane shown in FIG. 19 is displayed in the console unit. Subsequently, as shown in FIG. 12, an original 32 is put onto a digitizer 31, coordinates of the conversion color are inputted by using a coordinates input pen 33, and the coordinates of the conversion color are determined by conversion color designation key 3901 (step S501). A post-conversion color is subsequently designated by a post-conversion color designation key 3902 (S502). A desired one of registration colors which have previously been stored in the RAM 242 is selected by a key (not shown) of a console unit XXX. The post-conversion color is determined by using the post-conversion color designation key 3902. Subsequently, when the original is put on the original supporting glass plate and a preview key 3903 is depressed, the image data of the conversion color of the coordinates which have previously been designated by the digitizer is read by the prescan. On the basis of the image data, the read image data is set as conversion color data into the registers 1104, 1105, 1106, 1107, 1108, and 1109 of the color conversion circuit 205. At the same time, the registration color data designated as a post-conversion color stored in the RAM 242 is set as post-conversion color data into the registers 1116, 1117, and 1118 (S503). Subsequently, the reading operation of the original 32 is executed. Processes are executed in accordance with the order shown in the items on the monitor display of the RGB system editing processes mentioned above. The image after the color conversion is displayed on the monitor 219. In this instance, the coordinate position designated by the digitizer 31 is displayed by using a conversion color cursor 38 generated by the display controller 217-10 (S504). FIG. 11 shows a state in which the post-conversion color image in which the color of the image in a desired area 34 of the operator was converted and the conversion color cursor are simultaneously displayed. Subsequently, the operator checks the post-conversion color image displayed on the monitor 219, thereby discriminating whether the desired color converting process has been executed or not (S505). When the desired color converting process is executed, the copying operation is started by the copy start key 50001, the main scan is executed, the color conversion is performed on the basis of the set conversion color and post-conversion color, and the image is printed (S506). As shown in FIG. 13, when the coordinates designated on the digitizer and the coordinates on the original supporting glass plate are deviated and the desired color converting process is not executed, the conversion color cursor 38 is selected by a conversion color cursor selection key 3904, the conversion color cursor 38 is moved to the desired area by a cursor movement key 3906 while observing the monitor 219, and the coordinates of the conversion color are again set by the conversion color designation key 3901 (S507). FIG. 14 is a diagram showing a state in which the conversion color cursor 38 is moved to the desired area. Subsequently, the preview key 3903 is again depressed, the image data of the conversion color is read, and the above operations are repeated hereinlater.

Figure 5:
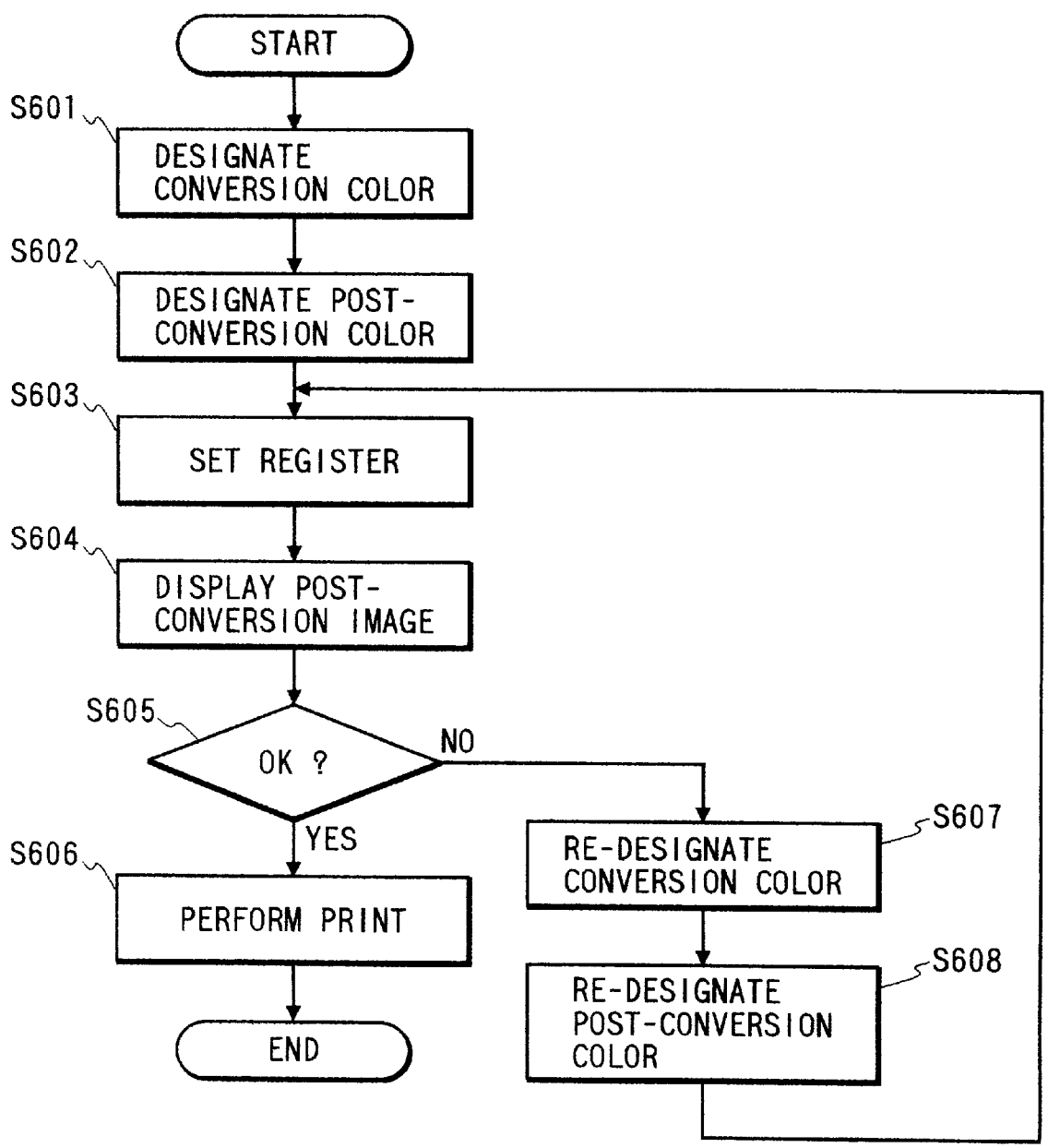
FIG. 5 is a diagram showing another example of a flow of a color converting process.

A method of correcting the coordinates of the post-conversion color by the preview system will now be described with reference to a flowchart of FIG. 5.

Figure 15:
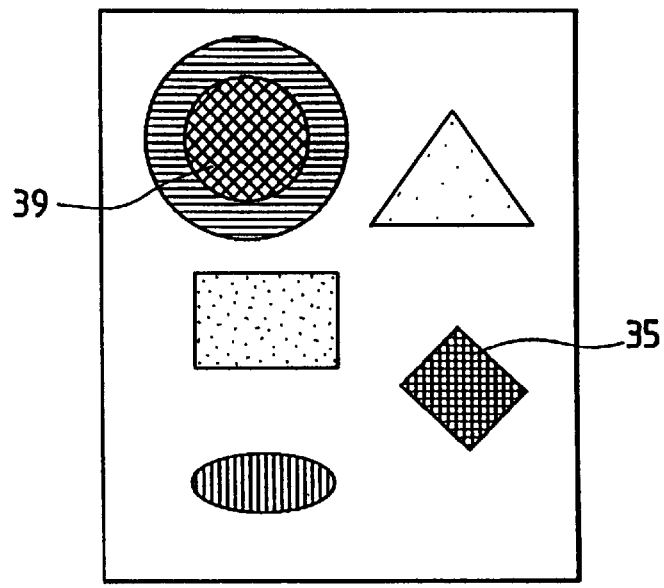
FIG. 15 is a diagram showing an example of a preview image in the color conversion.
Figure 16:
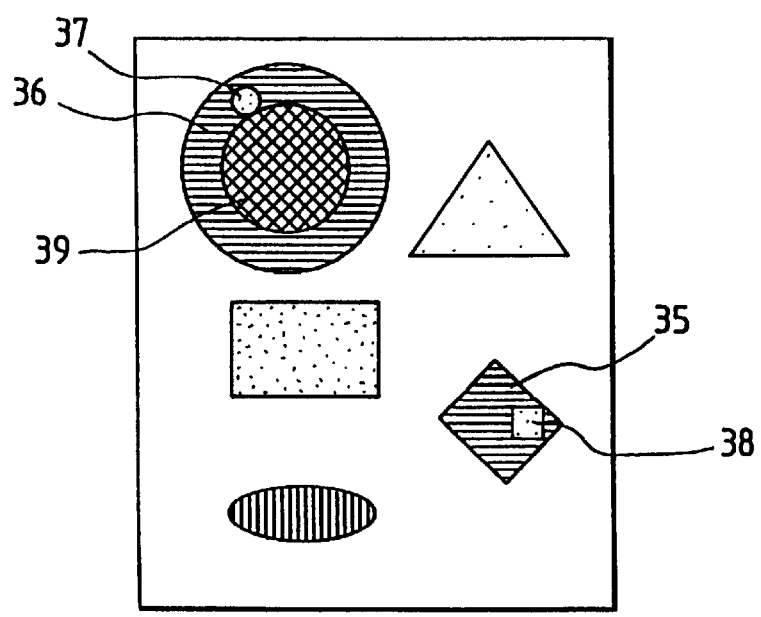
FIG. 16 is a diagram showing an example of a preview image in the color conversion.
Figure 17:
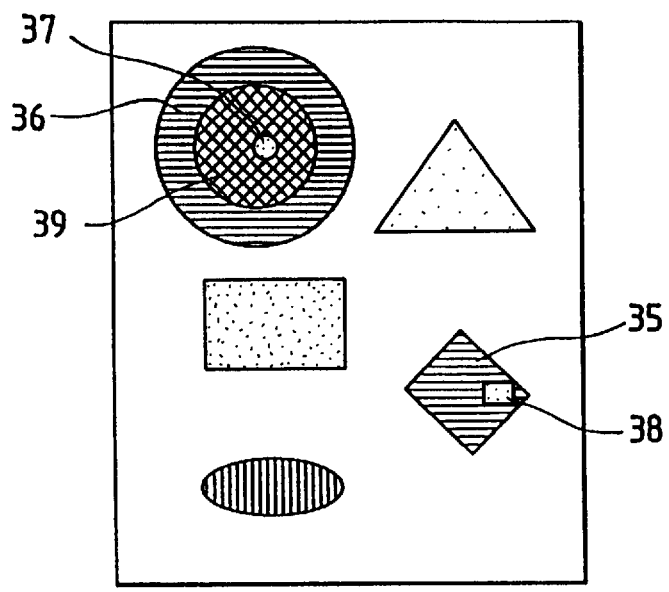
FIG. 17 is a diagram showing an example of a preview image in the color conversion.
Figure 18:
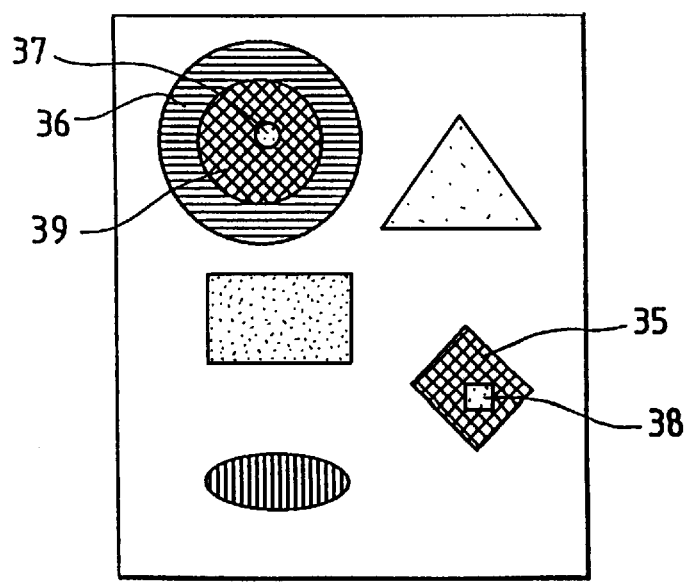
FIG. 18 is a diagram showing an example of a preview image in the color conversion.

A case of converting the color of an area 35 of the original image shown in FIG. 15 into the color of an area 39 will now be described as an example. When the operator selects a color conversion mode by a switch of the console unit, the operation picture plane shown in FIG. 19 is displayed on the console unit. The original is put onto the digitizer 31, the coordinates of the conversion color are inputted by using the coordinates input pen 33, and the coordinates of the conversion color are determined by the conversion color designation key 3901 (S601). Similarly, the coordinates of the post-conversion color are inputted by using the coordinates input pen 33 and the coordinates of the post-conversion color are determined by the post-conversion color designation key 3902 (S602). Subsequently, when the original is put onto the original supporting glass plate and the preview key 3903 is depressed, the image data of the conversion color and post-conversion color designated by the digitizer is read, the conversion color data is set in the registers 1104, 1105, 1106, 1107, 1108, and 1109 of the color conversion circuit 205, and the post-conversion color data is set into the registers 1116, 1117, and 1118 (S603). The reading operation of the original 32 is subsequently executed, the processes are executed in accordance with the order shown in the items on the monitor display of the above RGB system editing processes. The image after the color conversion is displayed on the monitor 219. In this instance, the coordinate position designated by the digitizer 31 is displayed by using the conversion color cursor 38 and a post-conversion color cursor 37 generated by the display controller 217-10 (S604). FIG. 18 shows a state in which the post-conversion color image in which the color of the area 35 which is desired by the operator was converted into the color of the area 39, the conversion color cursor 38, and the post-conversion color cursor 37 are simultaneously displayed. Subsequently, the operator checks the post-conversion color image displayed on the monitor 219, thereby judging whether the desired color converting process has been performed or not (S605). When the desired color converting process is executed, the copying operation is started by the copy start key 50001 (S607). The color converted image is outputted and the copying operation is finished. As shown in FIG. 16, when the coordinates designated on the digitizer and the coordinates on the original supporting glass plate are deviated and the desired color converting process is not executed, the post-conversion color cursor 37 and conversion color cursor 38 are selected by the conversion color selection key 3904 and a post-conversion color cursor selection key 3905 as necessary, the post-conversion color cursor 37 and conversion color cursor 38 which are moved in an interlocking manner with the cursor movement key 3906 are moved to the desired area while observing the monitor 219, the coordinates of the conversion color and post-conversion color are again set by the conversion color designation key 3901 and post-conversion color designation key 3902 (S607, S608). FIG. 17 is a diagram showing a state in which the post-conversion color cursor 37 is moved to the desired area 39. Subsequently, the preview key 3903 is again depressed, the image data of the conversion color and post-conversion color is read and the above operations are repeated.

A difference between the coordinate values on the monitor and the coordinate values on the input image is compensated by the CPU 240. Namely, each of the read address control unit 217-19 for controlling the positions of the conversion color cursor and the post-conversion color cursor which are displayed on the monitor and the area generation unit 230 to control the color conversion circuit 205 is controlled by the CPU 240 so as to be interlocked while compensating the difference between the coordinate values.

As mentioned above, according to the embodiment, since the digitizer is provided, the processes can be executed at a high speed as compared with the case of always designating the conversion color on the basis of the preview image.

Since the color can be finely adjusted by the preview image, the deviation of the designated color on the digitizer can be corrected and a desired color converting process can be executed.

Before the irreversible compression is performed, the color is detected on the basis of the coordinate position designated by the digitizer or preview image and the color converting process is executed for the image data before compression, so that the color conversion can be performed at a high precision.

It is also possible to designate the conversion color or post-conversion color by designating color patches which have been prepared on the digitizer by using the coordinates input pen. Data of the color patches has preliminarily been stored in the RAM 242.

Other Embodiments

The invention can be applied to a system constructed by a plurality of equipment (for example, a host computer, an interface equipment, a reader, a printer, and the like) or can be also applied to an apparatus constructed by one equipment (for example, a copying apparatus or a facsimile apparatus).

The present invention also incorporates an invention embodied by supplying program codes of a software to realize the functions of the embodiments to a computer in an apparatus or a system which is connected to various devices so as to make various devices operative in order to realize the functions of the foregoing embodiments and by making the various devices operative in accordance with the program stored in the computer (CPU or MPU) of the system or apparatus.

In this case, the program codes themselves of the software realize the functions of the foregoing embodiments and the program codes themselves and means for supplying the program codes to a computer, for example, a memory medium in which the program codes have been stored construct the invention.

As such a memory medium to store the program codes, for example, a floppy disk, a hard disk, an optical disk, a magnetooptic disk, a CD-ROM, a magnetic tape, a nonvolatile memory card, an ROM, or the like can be used.

Not only the functions of the foregoing embodiments are realized by executing the supplied program codes by the computer but also the program codes are obviously included in the embodiment of the invention in the case where the functions of the foregoing embodiments are realized in cooperation with the OS (operating system) by which the program codes operate in the computer or other application softwares or the like.

Further, it will be also obviously understood that the invention also incorporates a case where after the supplied program codes were stored in a memory provided for a function expansion board of a computer or a function expansion unit connected to the computer, a CPU or the like provided for the function expansion board or function expansion unit executes a part or all of actual processes on the basis of instructions of the program codes and the functions of the foregoing embodiments are realized by the processes.

Although the present invention has been described with respect to the preferred embodiments, the invention is not limited to the foregoing embodiments but many modifications and variations are possible within the spirit and scope of the appended claims of the invention.

What is claimed is:

1. An image processing apparatus for previewing an output result to be output by an image output means, comprising:
    a digitizer for designating a color on the basis of an original image;
    color designating means for designating a color on a preview image;
    color converting means for performing a color conversion on the basis of the color designated by said digitizer or the color designated by said color designating means; and
    operator input means for determining whether or not a preview image showing a processing result of color conversion based on the color designated by said digitizer is unsuitable to an operator,
    wherein if the preview image showing a processing result of the color conversion based on the color designated by said digitizer is unsuitable to an operator, a color is designated by said color designating means.

2. An apparatus according to claim 1, wherein said digitizer and said color designating means designate a conversion color included in the original image.

3. An apparatus according to claim 1, wherein said digitizer and said color designating means designate a post-conversion color.

4. An apparatus according to claim 3, wherein said post-conversion color is selected from a plurality of colors which have previously been stored.

5. An apparatus according to claim 1, wherein said digitizer and said color designating means designate the color on said original image or said preview image, thereby designating coordinates of said color.

6. An apparatus according to claim 4, further having converting means for converting coordinates on said preview image designated by said color designating means into coordinates on said original image.

7. An apparatus according to claim 1, further comprising
    compressing means for performing a compression to said color converted image data; and
    storing means for storing the compressed data.

8. An apparatus according to claim 7, further having display means for displaying a preview image on the basis of said stored image data.

9. An apparatus according to claim 8, wherein said designating means has:
    a digitizer for designating a conversion color on the basis of said original image; and
    color designating means for designating a conversion color on said preview image.

10. An apparatus according to claim 8, further having a scanner for reading said original image and forming image data.

11. An apparatus according to claim 8, further having image forming means for forming an image onto a recording medium on the basis of said stored image data.

12. An apparatus according to claim 8, further having:
    reading means for independently reading out said plurality of different stored image data from said storing means; and
    color processing means for independently color processing said plurality of image data.

13. An apparatus according to claim 12, wherein said reading means independently reads out said plurality of different image data with each of a plurality of image forming units of an image forming means.

14. An image processing apparatus for previewing an output result to be output by an image output means, comprising:
    first color designating means having a plane member on which an original is mountable, for inputting coordinate information relating to a color in the original;
    second color designating means for designating a color on a preview image;
    color converting means for performing a color conversion on the basis of the color designated by said first color designating means or the color designated by said second color designating means; and
    operator input means for determining whether or not a preview image showing a processing result of color conversion based on the color designated by said first color designating means is unsuitable to an operator,
    wherein if the preview image showing a processing result of the color conversion based on the color designated by said first color designating means is unsuitable to an operator, a color is designated by said second color designating means.

* * * * *